(12) United States Patent
Fukushima et al.

(10) Patent No.: US 6,477,204 B1
(45) Date of Patent: Nov. 5, 2002

(54) VIDEO IMAGE DECODING METHOD AND APPARATUS

(75) Inventors: Michihiro Fukushima, Kanagawa-ken; Shuji Abe, Tokyo; Masahiro Yamada, Kanagawa-ken, all of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/216,910

(22) Filed: Dec. 21, 1998

(30) Foreign Application Priority Data

Dec. 19, 1997 (JP) ............................................. 9-351442
Mar. 2, 1998 (JP) ........................................... 10-049619

(51) Int. Cl.[7] ................................................ H04N 7/12
(52) U.S. Cl. ............................... 375/240.31; 375/240.31
(58) Field of Search ...................... 375/240.28, 240.26, 375/240.31; 348/500, 501, 510, 516, 521, 536, 388.1, 425.4, 425.1; H04N 7/12

(56) References Cited

U.S. PATENT DOCUMENTS 5,703,877 A * 12/1997 Nuber et al. ................. 370/395
5,828,414 A * 10/1998 Paelins et al. .......... 375/240.01
6,072,832 A * 6/2000 Katto .......................... 375/240
6,195,392 B1 * 2/2001 O'Grady ................. 375/240.28
6,313,879 B1 * 11/2001 Kubo et al. .................. 348/512

FOREIGN PATENT DOCUMENTS

JP          8-116532          5/1996

* cited by examiner

Primary Examiner—Nhon Diep
(74) Attorney, Agent, or Firm—Pillsbury Winthrop LLP

(57) ABSTRACT

When stream video image signal are decoded simultaneously, and synchronized so as to be displayed on a screen, it prevents the disturbance of the displayed video image caused by changing the master. The DEMUX 101 separates the each channel video image signal and PCR from the multiplexed stream. The separated video image signal is stored in the input buffer memories 107 through 101. The master selector comprised of the PCR selector 120 and the STC selector 121 select the master. The selected master STC, the comparator 123, the OPF 124 and the VCO125 comprise the PLL. From the VOC 125 the system clock is regenerated, and the synchronizing signal generator 126 generates the decode starting signal and the display synchronizing signal based on the system clock. From the STC counters 103 through 106 the reference time information of each channels are obtained. The decoding controllers 111 through 114 work over the each decoders 115 through 118 to start decoding based on the decode starting signal.

17 Claims, 16 Drawing Sheets

VIDEO IMAGE DECODING METHOD AND APPARATUS

FIELD OF THE INVENTION

The present invention generally relates to a video image signal decoding method and apparatus for decoding a plurality of decoded video image signals simultaneously.

BACKGROUND OF THE INVENTION

Conventionally, in the system for transmitting the moving picture or the audio such as the television broadcast, the television conference system or the television telephone, or the system for recording the moving picture or the audio signal in the magnetic disc, the optical disc or the magnetic tape, and for reproducing the recorded signal, the high efficiency coding is performed then the transmission efficiency enhanced, in order to use the transmission channel or the recording medium effectively.

Also in recent years, a digital satellite broadcast via a broadcast satellite or communications satellite starts in order to solve the channel insufficiency of the analog ground wave television broadcasts or to develop new multi-channel services. Also, there are moves of digitizing the cable television (CATV) transmitted through a communication channel of coaxial cables or optical fiber cables or the ground wave broadcast.

Since in the digital broadcast the digitized video image signal or audio signal are high efficiency compressed through the use of the compression technique such as the MPEG system or the AC-3 system it is possible to secure channels by six to eight times larger than that in a conventional analog broadcast system in the same band width, so as to enhance a variety of services.

There is an MPEG-2 (MPEG stands for Moving Picture Expert Group) as a typical high efficiency coding system. The MPEG-2 is a coding standard which has been fostered standardization as the ISO/IEC 13818 which is the JTC (Joint Technical Committee) of the ISO (International Organization for Standardization) and the IEC (International Electro-Technical Commission).

MPEG-2 defines not only the coding, but also the multiplexing of the video or the audio data streams in order to make use of data streams of encoded video and/or audio data for a wide range of applications. This standard is called the MPEG-2 standard, and there are two kinds according to the use of data stream, i.e., the transport stream (TS: Transport Stream) for the broadcast and communicating, and the program stream (PS: Program Stream) for the storing and recording.

The transport stream is considered to transmit a plurality of programs in one stream, which will be supplied to many broadcast or communicating in the future.

On the other hand, it has been possible to decode the MPEG compression video image signal in the DSP (Digital Signal Processor). Since the processing faculty of the hardware in the DSP or the IC motion speed are improved, it is also possible to decode a plurality of video image signals or audio signals contained in the MPEG streams.

In the digital broadcast system, at the transmitter side, a plurality of MPEG-encoded video image data (TS packets) are multiplexed into one transport system, and the transport stream and other transport streams generated in the similar manner are transmitted to the transponder such as the satellite by carrier waved with different frequencies, and in receivers a plurality of transport streams which are transmitted in conjunction with carrier waves with the different frequencies are decoded in the decoder different for each frequency (containing the tuner), and from each decoded transport stream one selected video image data is MPEG-decoded, so that the decoded video image signals are displayed on the multiple screen of the display device such as the cathode lay tube (CRT), or a MPEG-decoded video images are displayed on different display devices.

When such a digital TV broadcast is received, in order to make it simple for viewer to select a desired channel, the video image signals in a plurality of channels are decoded simultaneously, a TV screen is divided into a plurality of small screens, so as to provide the multi screen display function to display these decoded channel video image signals on the respective small screens simultaneously.

That is, it is assumed that the MPEG transport system in which a plural channel of encoded TV signals are multiplexed is received, and each channels is simultaneously decoded and the combined together so as to be displayed in multi-windows on a TV screen. In this case, as shown in FIG. 1, the transport stream is demultiplexed into each TV channels in a demultiplexer (DEMUX) 101, then each of the TV channels are stored in each of the input buffer memories 201 through 204.

Here the circuit of FIG. 1 represents a related art imagined by Inventors for reference purposes to make the understanding of the present invention as described later easy, wherein a plurality of basic low circuits each comprised of one conventional decoder are coupled in parallel. Then, these video image signal streams are decoded separately in the decoders 115 through 118, and each of the decoded video image signals is stored in each of the output buffer memories 205 through 208.

Then, as shown in FIG. 2, the video signal in each channel is decoded according to the decode starting information contained in the video image signal stream in each channel. Further, in these video image signal streams to be decoded a video image signal to be assigned to a master video image signal is selected, and the decoded video image signals stored in the output buffer memories 205 through 208 are read out by the use of a synchronizing signal reproduced from the data which are used when the video signal assigned to the master video image signal is displayed, then these decoded video image signals are displayed on one screen after synchronized with each other in a synchronizer 119.

However in the conventional apparatus mentioned above, in order to match the Synchronization for combining the decoded video image signals the output buffer memory for storing the decoded video image signal is required.

Further, through the use of that of the video image signal to be assigned to a master video image signal for the vertical synchronizing signal of the display, the synchronizing signal is changed every when the mater is changed, as shown in FIG. 2, so that the phase of the vertical synchronizing signal is also changed simultaneously. Accordingly there had been a problem that the displayed video image is disturbed at the master changing time.

FIG. 3 is a block diagram showing the conventional MPEG decoder for processing a plurality of video image data. Here, it will be explained that the two video image data selected from each two transport streams are supplied to each first and the second video decoders 10 and 20 as the two input streams. The two input streams are supplied to the input terminals 11 and 21 of the first and the second video decoders, respectively. The video streams supplied to the input terminals 11 and 21 are supplied to the MPEG decoders 12 and 22 inside the first and the second video decoders so as to output the MPEG-decoded video image signals to the output terminals 13 and 23.

To the MPEG decoders 12 and 22, the clock counting values from the STC counters 15 and 25 (STC stands for the System Time Clock meaning the reference synchronizing signal), and the synchronizing signals from the synchronizing signal generators 18 and 28 based on the clock counting value are supplied.

In the PCR detectors 14 and 24 the PCR (Program Clock Reference: the program time reference value) which are the reference time information of the video image signals are extracted from each streams supplied to the input terminals 11 and 21. Each video decoders 10 and 20 are provided with each separated generators 17 and 27. Here, the PCR is contained in the input stream at a specific cycle (for instance, the cycle of 100 ms), which is used for setting or correcting the counts of the STC counters 15 and 25 to the desired counts intended at the MPEG encoder side by periodically comparing and consulting with the PCR.

The clock generated in the clock generator 17 inside the first video decoder 10 is counted in the STC counter 15. In the comparator 16, the PCR extracted from the first input stream in the PCR detector 14 and the count of the STC counter 15 are compared. Here, in the case that the difference between the values is relatively large the current PCR is loaded to the STC counter 15. While in the case that the difference is relatively small the frequency offset of the clock is detected from the difference information and the frequency is corrected to the clock generator 17.

The clock generated in the clock generator 27 inside the second video decoder 20 is counted in the STC counter 25. In the comparator 26, the PCR extracted from the second input stream in the PCR detector 24 and the count of the STC counter 25 are compared. Here, in the case that the difference between the counts is relatively large the PCR is loaded to the STC counter 25, and the in the case that the difference is relatively small the frequency offset of the clock is detected from the difference information and the frequency is corrected to the clock generator 27.

Accordingly, since the clock generators 17 and 27 oscillate at the frequency depending on the two input video streams, the MPEG decoding systems are operated by two clocks.

By the way, in the MPEG decoder, in the case of performing the video image signal processing in the DSP, the two video image data are possible to be processed in one DSP if it is a high speed type one, however, since one DSP is operated by one clock its processing is hard. Further, since the circuit systems operated by two clocks are not operated by the one clock it is hard to set up the controller, and since the distribution of the clock is fixed at the setup timing of each circuit the system with less flexibility.

SUMMARY OF THE INVENTION

It is, therefore, the present invention has an object to remove the drawbacks in the conventional apparatus and provide a video image signal decoding method and apparatus for preventing the disturbance of the displayed video image when a master video image is interchanged among a plurality of video images simultaneously displayed on the screen.

Further, the present inventions has another object to provide a video image signal decoding method and apparatus for eliminating output buffer memories used for controlling video image signals and for reducing the amount of hardware in the video image signal decoder.

So, the present invention provides a decoder for performing a plurality of decode processings by one clock, so as to make the system set up easy.

In order to achieve the above object, a video image signal decoding method according to the first aspect of the present invention includes the steps of a first step for separating at least one of streams of video image signal to be decoded from a multiplexed stream received therein, which contains a plurality of video image signals, a second step for selecting one stream including a video image signal to be assigned to a master video image signal, which will be assigned to a master stream from the multiplexed stream, a third step for regenerating a reference time and a system clock which are used in decoding of the video signal to assigned to the master video image signal, based on a reference time information contained in the master stream, a fourth step for regenerating a reference time used for decoding the separated video image signal through the use of the reference time information contained in the separated stream of the video image signal to be decoded and the regenerated system clock, a fifth step for generating a decode starting signal through the use of the regenerated system clock, a sixth step for storing the video image signal contained in the separated stream in an input buffer memory, in parallel with the processing of the steps 2 through 5, and a seventh step for starting a decoding of the video image signal stored in the input buffer memory by the decode starting signal.

A decoder according to the first aspect of the present invention includes a separator for separating at least one of streams of video image signal to be decoded from a multiplexed stream received therein, which contains a plurality of video image signal, a selector for selecting one stream including a video image signal to be assigned to a master video image signal, which will be assigned to a master stream from the multiplexed stream, at least one buffer memory for storing the video image signal contained in each separated stream, a clock regenerator for regenerating a reference time and a system clock which are used in decoding of the video image signal to assigned to the master video image signal, based on a reference time information contained in the master stream, a reference time regenerator for regenerating a reference time used for decoding the separated video image signal through the use of the reference time information contained in the stream of the video image signal to be decoded and the regenerated system clock, a decode starting signal generator for generating a decode starting signal which is common to each of the separated stream through the use of the regenerated system clock, and at least one decoder for starting a decoding of the video image signal stored in the input buffer memory by the decode starting signal.

Further in the first aspect of the present invention, the decode starting signal is a signal synchronized with a synchronizing signal in a display system which is not depend upon the decode starting time information contained in the video image signal to be assigned to a master video image signal.

Furthermore in the first aspect of the present invention, the capacity secured as the input buffer memory must be larger more than the maximum data amount supplied for one frame period of the video image signal assigned to the marker video image than the data amount required for starting decoding based on the decode starting time information contained in the data.

According to the first aspect of the present invention, since at least one stream to be decoded separated from the multiplexed stream, that the streams containing the encoded video image signal are multiplexed, are stored in each of the input buffer memories, and the video image signal are decoded in each decoders which correspond to the input buffer memories by the common decode starting signal of each streams, the timings of the video image signal output from each decoders are matched, and the video image signal is possible to be combined into one screen in the combiner directly without using of output buffer memories.

Further, since the phase of the synchronizing signal is not disturbed even the stream of the video image signal to be assigned to a master video image signal is interchanged it is possible to prevent the disturbance of the displayed video image at the master changing time.

According to the second aspect of the present invention, a decode processor configured to decode a stream of MPEG-encoded video image data transmitted to conjunction with reference time information includes a reference time information detector for detecting the reference time information contained in the stream, a clock generator for generating a clock having a frequency which is not locked to a clock in a transmitter for transmitting the stream, a counter for counting the clock from the clock generator, which count is amended by the direction from the reference time information detector, a synchronizing signal generator for generating a synchronizing signal based on the count of the counter, and a decoder for decoding the stream according to the count of the counter.

According to the second aspect of the present invention, when two video image data having each reference time information for instance are decoded in the first and the second video decoders the decode processor according to the second aspect of the present invention is used at least for the first video decoder, so that it is possible to decode one clock from the clock generator in the first and the second video decoders in common. This is, on one hand, the clock from the clock generator is used as that of the second decoder, on the other hand, when the clock from the clock generator is used by counted in the counter of the first video decoder the counting value is corrected by the detected value from the reference video information detector inside the first video decoder. That is, it is possible to provide the system capable of decoding the one clock non-synchronized with a plurality of video decoders.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 4 through 19.

Referring now to the attached drawings, an embodiment of the first aspect of the present invention will be explained in detail.

In the embodiment, an example for decoding the transport stream wherein four MPEG-encoded moving picture signals have been multiplexed (hereinafter referred to as ch1 through ch4) will be explained.

Figure 4:
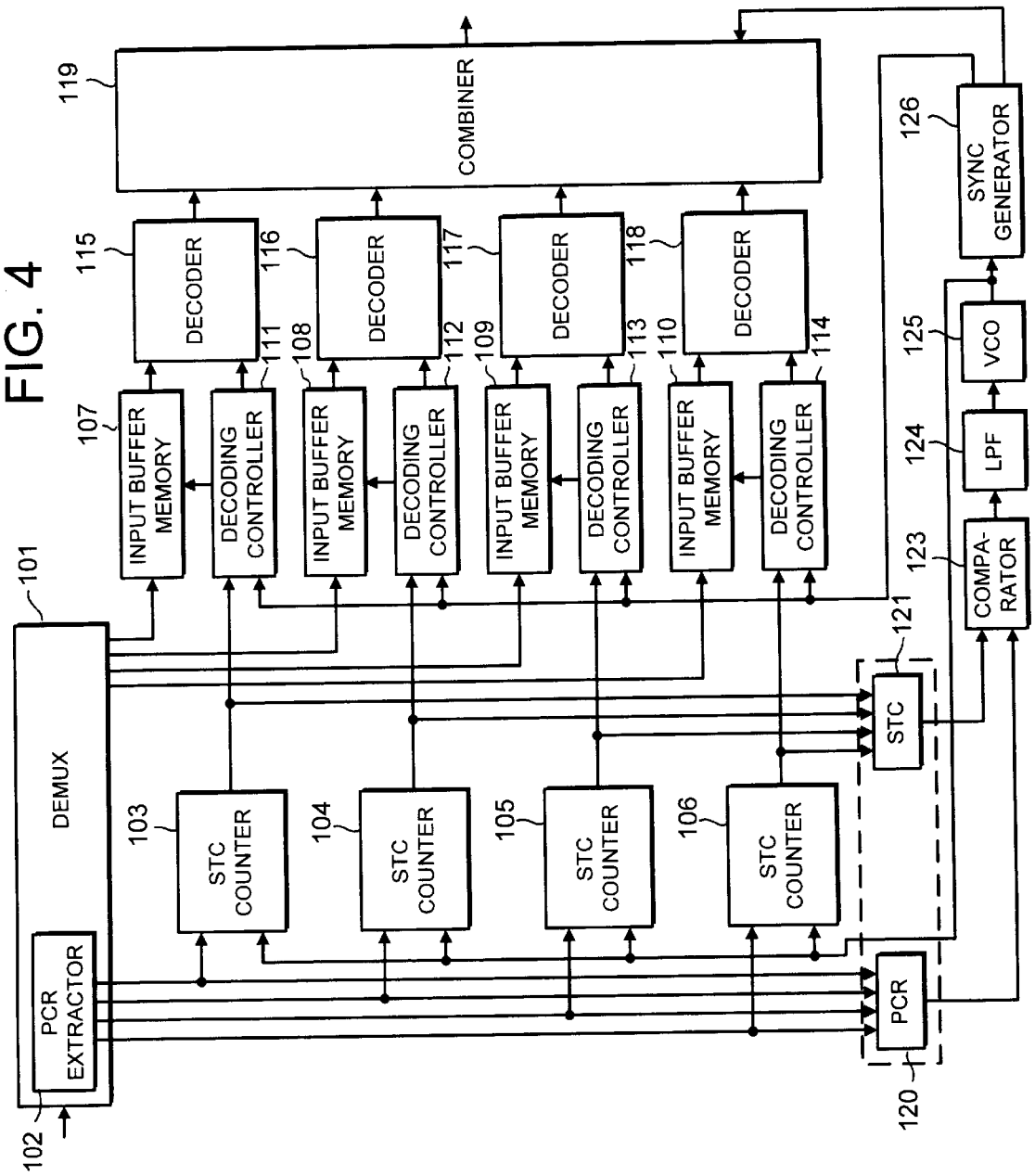
FIG. 4 is a block diagram showing the construction of the decoder in this embodiment according to the first aspect of the present invention.

FIG. 4 is a block diagram showing the construction of the embodiment of the video image signal decoder according to the first aspect of the present invention. In FIG. 4, the video image signal decoder is provided with a demultiplexer 101 (hereinafter referred to as DEMUX) that is the separator for separating the encoded video image signal stream from the transport stream, a PCR extractor 102 for separating and extracting the PCR that is the reference time information of each channels, contained in the DEMUX 101, STC counters 103 through 106 for regenerating the reference time of each channels through the use of each PCR, a PCR selector 120 and a STC selector 121 that are the master selector for selecting the PCR and STC counters to be masters from the four channels PCR and STC counters, input buffer memories 107 through 110 for storing video image signal stream of each channels separated from the DEMUX 101, a comparator 123 for comparing the counter values of the PCR and STC which are selected as the master, a low pass filter (LPF) 124, a voltage-controlled oscillator (VCO) 125 for generating the system clock, a synchronizing signal generator 126 for generating the display synchronizing signal and the decode starting signals which are common with each channels based on the system clock, decoding controllers 111 through 114 for starting decoding the encoded video image signal stored in the input buffer memories 107 through 110 according to the decode starting signal, decoders 115 through 118 for starting decoding the encoded video image signal of each channels by controlling in the decoding controllers 111 through 114, and a combiner 119 for combining four channels decoding results.

Here, the STC counter to be a master which is selected in the STC selector 121, the comparator 123, the LPF 124, and the VCO 125 form a PLL (phase lock loop) which is system clock regenerator. From the selected STC counter the reference time used for decoding the video image signal to be a master is obtained, and from the VOC 125 the system clock used in common with the each channels is obtained.

Figure 5:
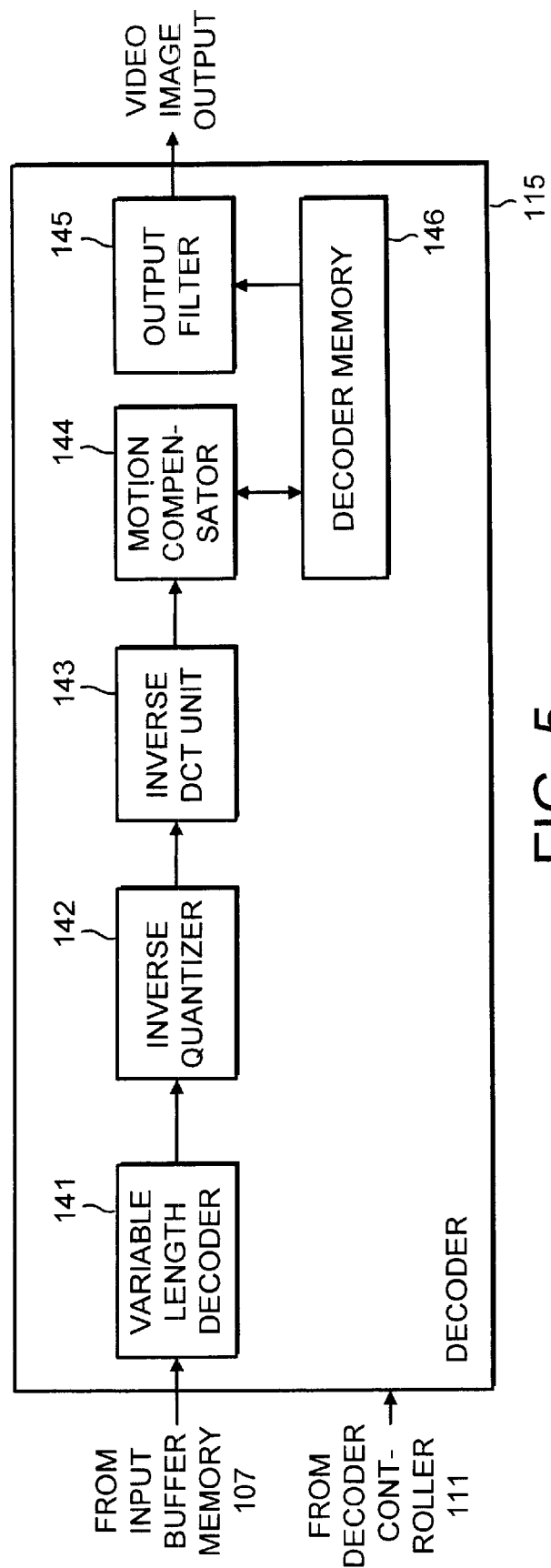
FIG. 5 is a detail block diagram showing the construction of the decoder used in the embodiment.

Further, FIG. 5 is a block diagram showing the internal arrangement of the decoder 115. Four decoders 115 through 118, as shown in FIG. 4, having configurations similar to each other are identical with the conventional MPEG decoder. Thus they are illustratively represented by the decoder 15. In FIG. 5, the decoder 115 is provided with a variable length decoder 141, an inverse quantizer 142, an inverse DCT (Inverse Discrete Cosine Transform) unit 143, a motion compensator 144, a decoder memory 146, and an output filter 145. The encoded video image signal stored in the input buffer memory 107, as shown in FIG. 4, is supplied to the variable length encoder 141. And the decoding controller 111 controls the whole over the decoder 115.

Now, the operation of the video image signal decoder, as shown in FIG. 4, will be explained. The input transport stream is separated into four channel encoded video image signal streams based on the packet identifier (hereinafter, referred to PID) in the transport stream by the DEMUX 101, and these data streams are stored in the input buffer memories 107 through 110 defined on each channels, then they are decoded in the decoders 115 through 118 by each channels.

Here, the video image signal of ch1 is decoded in the decoder 115 through the use of the STC counter 103 as the reference time. In the similar manner, the video image signal of ch2 is decoded in the decoder 116 according to the reference time counted in the STC counter 104. The video image signal of ch3 is decoded in the decoder 117 according to the reference time counted in the STC counter 105. The video image signal of ch4 is decoded in the decoder 118 according to the reference time counted in the STC counter 106.

Further, the PCRs of the respective channels are extracted from the input streams in the PCR extractor 102, and then transmitted to the STC counters 103 through 106, respectively.

First, the operation for regenerating the system clock and reference time (STC) in the case that the master stream is ch1 will be explained. From the stream input to the DEMUX 101 the PCR contained in the ch1 stream is extracted through the use of the PCR extractor 102, then the PCR is transmitted to the STC counter 103. The STC counter 103 receives the ch1 stream. When receiving the first PCR, the STC counter 103 captures the PCR and then activates the STC counters 103 through 104 according to the system clock output from the VCO 125.

When a next PCR in ch1 is extracted in the PCR extractor 102 the next order PCR in the ch1 and the STC count of the ch1 counted in the counter 103 are supplied to the PLL which is comprised of the comparator 123, the LPF 124 and the VCO 125 via the PCR selector 120 that is the master stream selector and the STC selector 121, then the system clock locked to the ch1 stream is regenerated. In the similar manner, according to that the difference is reflected to the PLL the stable system clock is kept regenerating.

Here, when the master system is interchanged with that in other channel, an abrupt change of the frequency of the system clock will be avoided by loading the PCR detected just after changing the master stream to the STC counter and making the difference just after changing is zero.

On the other hand, about the streams of ch2, ch3, and ch4 that are the slavestreams but the master stream, the PCR contained in each slavestreams is extracted in the PCR extractor 102, then the PCRs are transmitted to the STC counters 104, 105 and 106 which are corresponding to each ch2, ch3, and ch4. These STC counters 104 through 106 downloads these transmitted PCR to each counters, and operates according to the system clock locked to the master stream output from the VCO 125. That is, the STC counter allotted to the slave streams performs the counting operation as rewriting the count of the STC counter into the PCR every when the PCR is extracted.

Now, the operation for generating the decode starting signal from the system clock which is synchronizing to the master stream will be explained. The decode starting signal and the vertical and horizontal display synchronizing signal are generated by transmitting the system clock output from the VOC 125 to the synchronizing signal generator 126 and dividing the transmitted system clock in the counter or the divider.

Originally, the decode starting signal should be controlled to coincide with the decoding start time (hereinafter, referred to DTS) information contained in the master stream. However, in the first aspect of the present invention, the decode starting signal is generated in the system clock without the use of the DTS.

Figure 6:
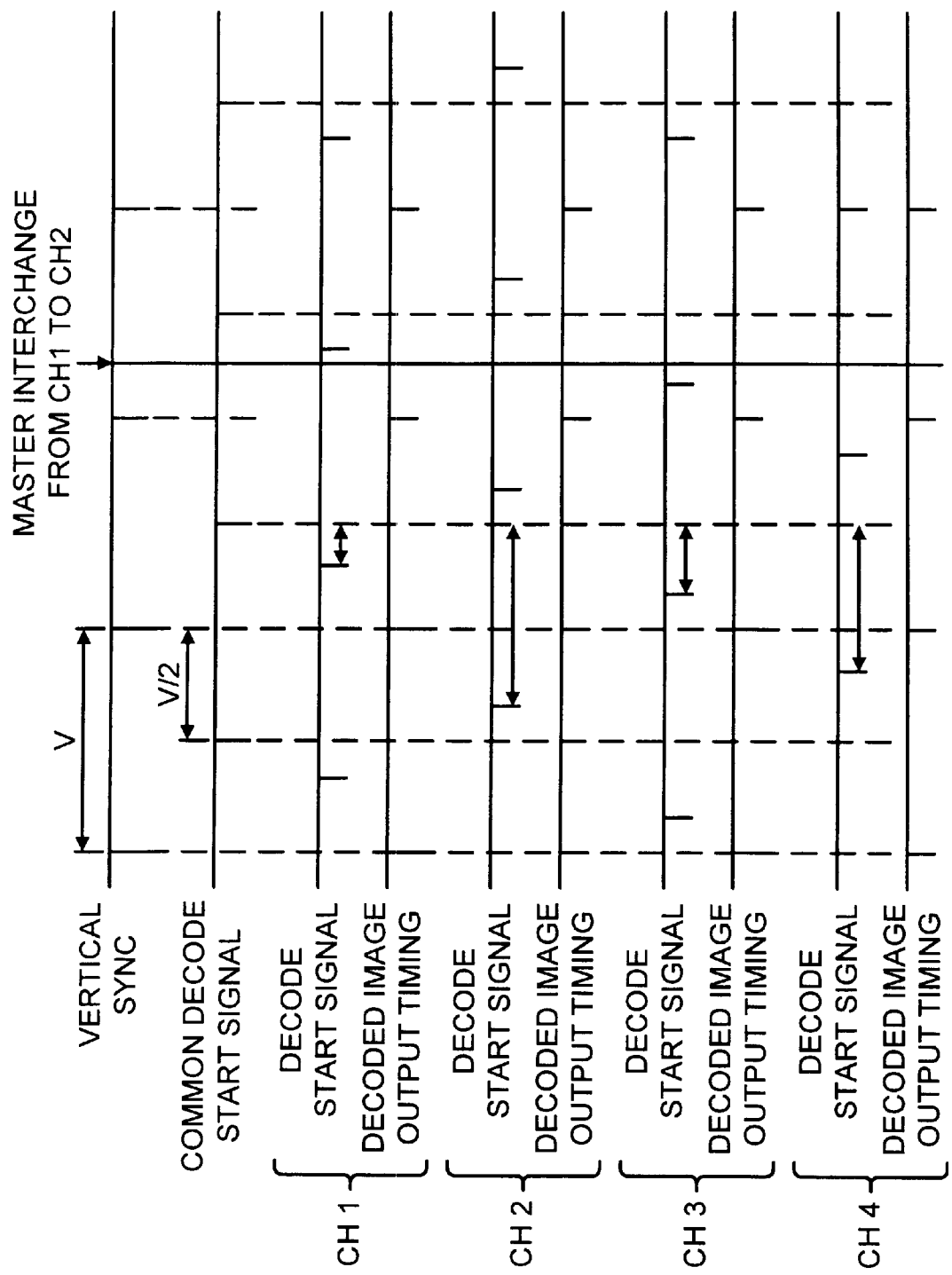
FIG. 6 is a decoding timing chart for explaining the operation of the embodiment.

Accordingly, even in the case that a master stream is interchanged from one in ch1 to another in ch2, as shown in FIG. 6, the decode starting signal is generated at the fixed phase regardless of the phase of the decode starting information contained in each ch. Further, the frequency of the decode starting signal is coincided with the flame rate of the master stream. That is, it is needless to say that the frequency of the decode starting signal is changed to the flame rate of the changed master stream if the master stream has been interchanged.

Now, the decode starting operation in each decoder will be explained.

When the decode starting signal which is common to each channels generated in the way mentioned above is supplied to the decoding controller 111 through 114, the values of each STC counters 103 through 106 is compared to the DTs contained in the streams at that timing.

According to this comparison, when the value of the DTS is smaller than the STC counter value, the decoding of the present flame starts in the corresponding decoder at the timing of the decode starting signal. Here, it is needless to say that when the DTS is smaller than the STC counter value by at least one flame, the decoding is skipped up to the flame that the DTS is larger than the count of the STC counter.

If the DTS is larger than the count of the STC counter the decoding operation is deactivated until the next decode starting signal is supplied. Further, if the data are the of the flame which does not contain the DTS the flame is decoded at the timing of the input decode starting signal, as well as the DTS is determined to be smaller than the STC counter.

Here, since the each ch data start at the decode starting time different from the original decode starting time information (DTS) (see FIG. 6), the decode starting time in the decoders 115 through 118 of each channels is delayed for one flame time of the video image signal to be assigned to a master video image signal in maximum compared with the original DTS time. Accordingly, the input buffer memories 107 through 110 are required to have buffer capacities larger than the input buffer capacities required to initiating the decoding at the essential DTS, by more than the maximum data amount supplied for one frame period of the video image signal to be assigned to the master picture.

Accordingly, a plurality of channel video image signals decoded simultaneously are possible to be output by synchronizing into one screen via the synchronizing 119 for instance, without having the output buffer memory for matching synchronization in the decoders 115 through 118.

Furthermore, since the display vertical and horizontal synchronizing signal is generated in the synchronizing signal generator based on the system clock regardless of the decode starting time information contained in the encoded video image signal stream to be assigned to a master stream, the phase of the synchronizing signal is not affected by the interchange of the master, so that there is no disturbance on the screen at the master changing time.

Figure 7:
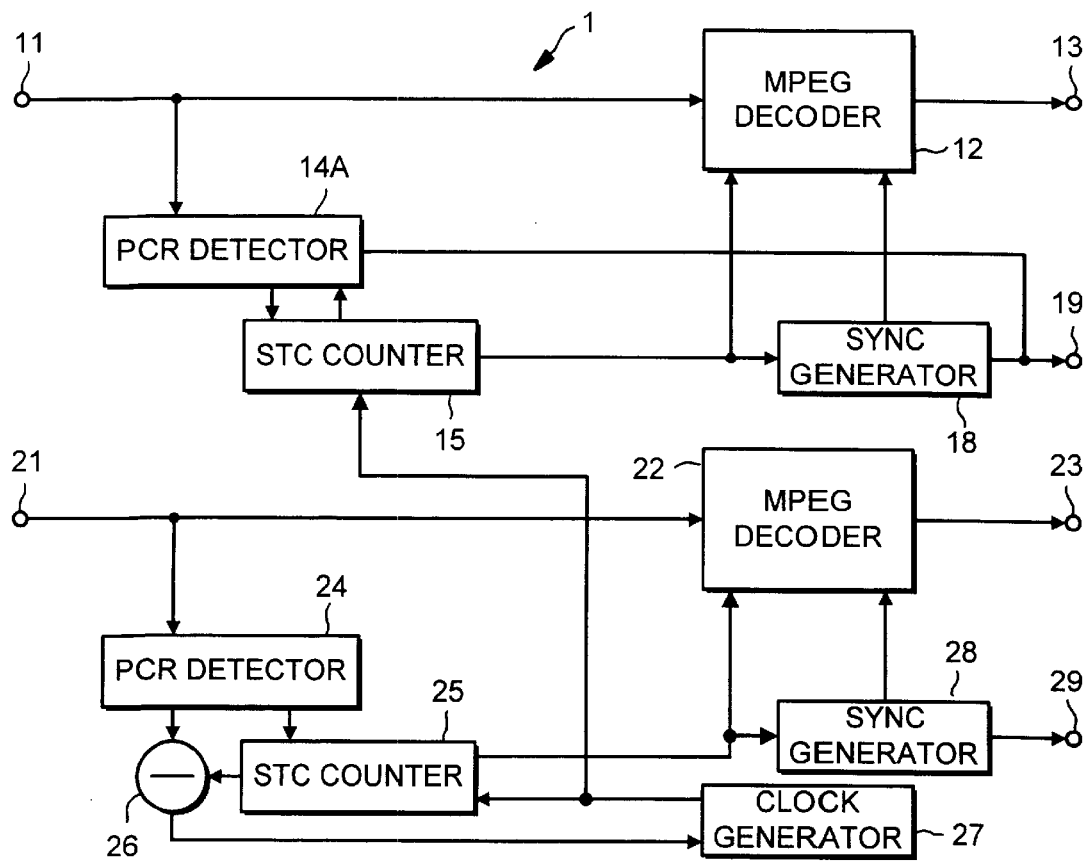
FIG. 7 is a block diagram showing the decode processor of the first embodiment according to the second aspect of the present invention.
Figure 8:
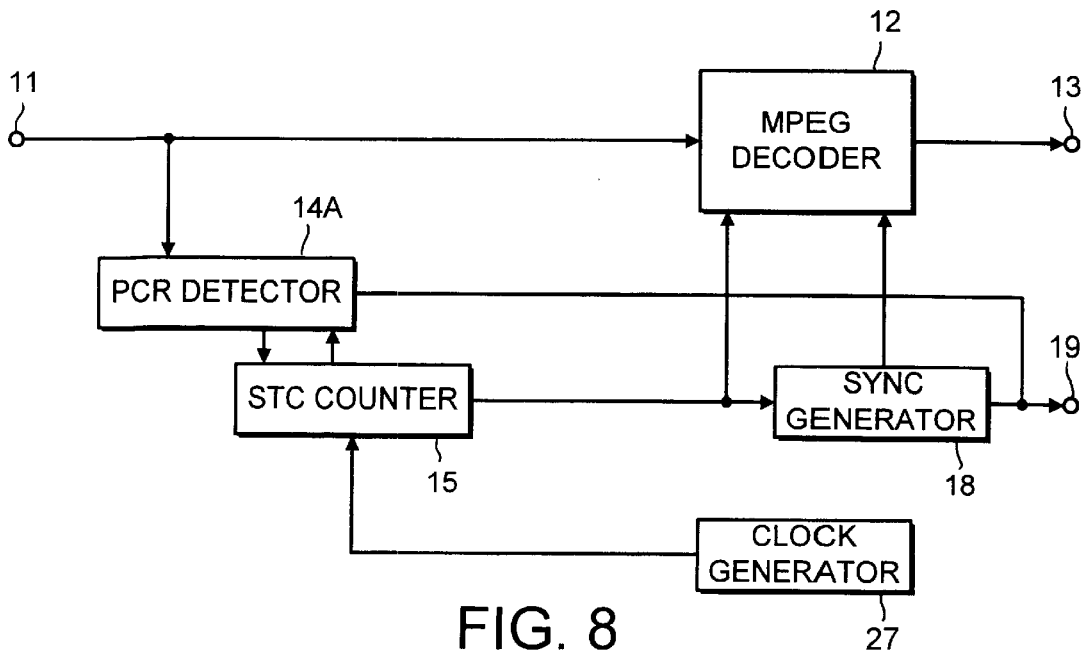
FIG. 8 is a block diagram showing the basic processing circuit used in FIG. 7.
Figure 9:
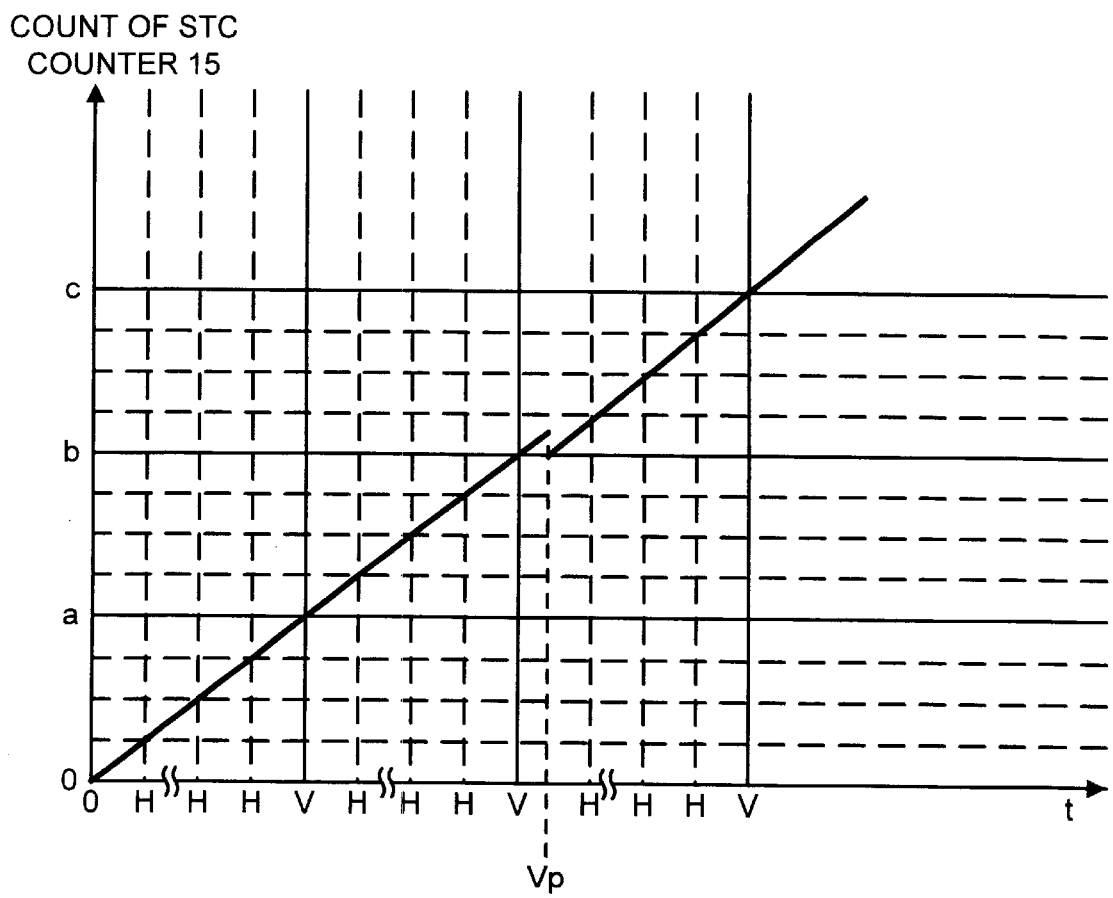
FIG. 9 is a diagram explaining the operation of FIG. 2.
Figure 10:
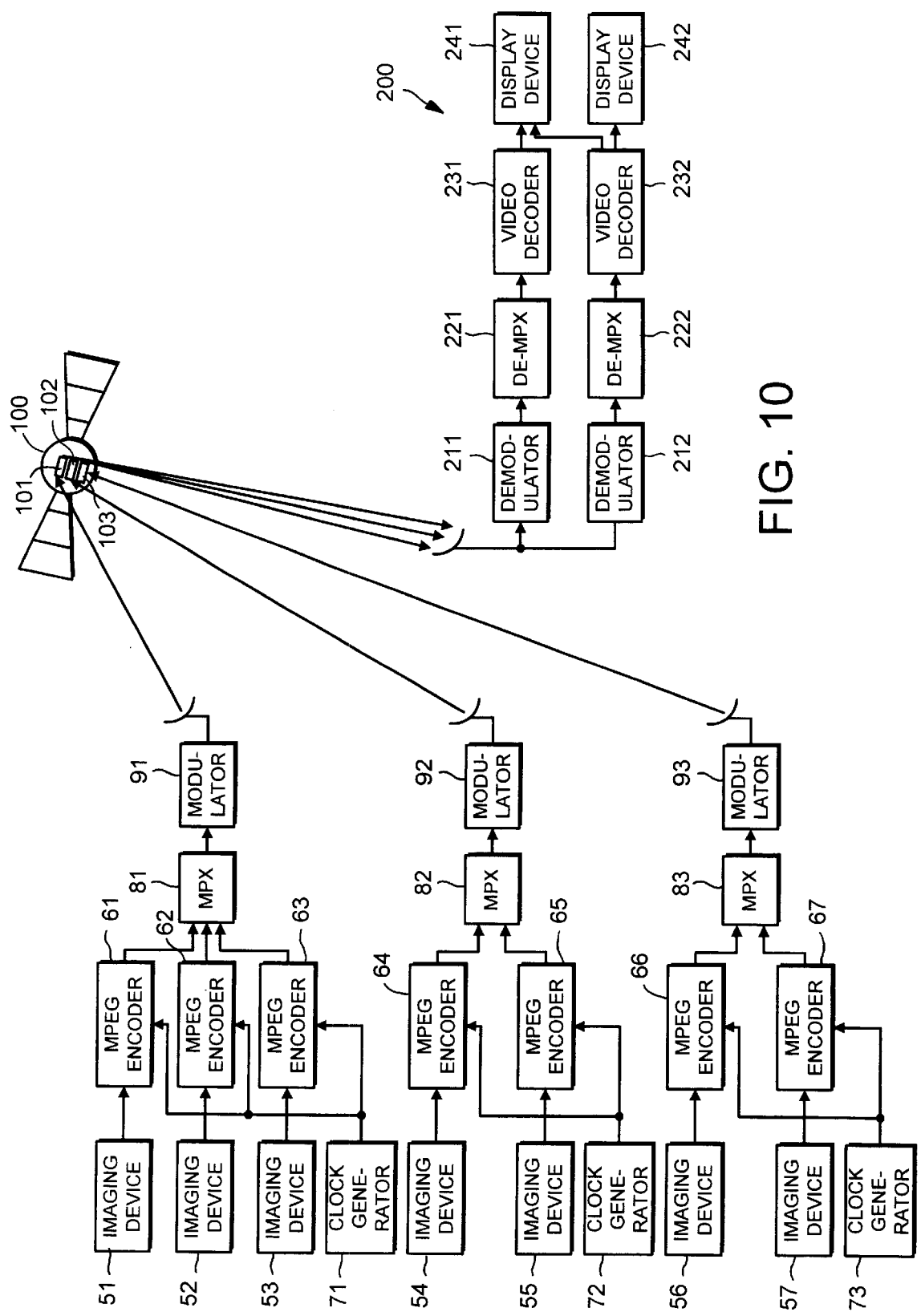
FIG. 10 is a block diagram showing the whole construction of the digital broadcast system according to the second aspect of the present invention.

Referring not to FIGS. 7 through 10, an embodiment of the second aspect of the present invention will be explained hereinafter. FIG. 7 is a block diagram showing the decode processor of the first embodiment of the second aspect of the present invention. FIG. 8 is a block diagram showing the basic processing in the decoder, as shown in FIG. 7. Accordingly, FIG. 7 shows the embodiment for decoding a plurality of input video image data through the use of the circuit of the FIG. 8 as its basic configuration. FIG. 9 is a diagram for explaining the operation of FIG. 8. FIG. 10 is a block diagram showing the general construction of the digital broadcast system according to the second aspect of the present invention.

For a start, the general construction of the digital broadcast system will be explained in reference to FIG. 10. In the digital broadcast system, at the transmitter side, a plurality of video image signals captured by imaging devices 51 through 57 are supplied to the MPEG encoders 61 through 67, and then MPEG-encoded by the MPEG encoders 61 through 67 so as to generate the transport packet. In FIG. 10, the MPEG encoders 61 through 67 are divided into three transport groups, and a plurality of MPEG encoders 61 through 63 (in FIG. 10, three MPEG encoders are provided) are operated by the clock generated from a clock generator 71. A plurality of MPEG encoders 64 and 65 (in FIG. 10, two MPEG encoders are provided) are operated by a clock generator 72. In the similar manner, a plurality of MPEG encoders 66 and 67 (in FIG. 10, two MPEG encoders are provided) are operated by the clock from a clock generator 73. Then, a plurality of TS packets output from the MPEG encoders 61 through 63 are multiplexed in the multiplexer 81 into one transport stream, and the carrier wave is modulated in the modulator 91 so as to be transmitted to the satellite 100 from the antenna. In the similar manner, a plurality of TS packets output from the MPEG encoders 64 and 65 are multiplexed in the multiplexer 82 into one transport stream, and the carrier wave is modulated in the modulator 92 so as to be transmitted to the satellite 100 through an antenna. In the similar manner also, the TS packets output from MPEG encoders 66 and 67 are multiplexed into one transport stream in the multiplexer 83, and the carrier wave is modulated in the modulator 93 so as to be transmitted to the satellite 100 through the antennas. In the satellite 100, three transport streams transmitted from the three transport groups are amplified in each different transponders 101 through 103 so as to be retransmitted. In the receiver these carrier waves by these transport streams are supplied to the digital broadcast receiver 200 through the antenna. The digital broadcast receiver 200 here has a construction capable of receiving the two transport streams at the similar manner.

In the digital broadcast receiver 200, a plurality of transport streams transmitted by the carrier wave having the different frequency are demodulated in the different demodulators (containing the tuner) 211 and 212 according to the frequency, and these decoded transport streams are supplied to the two demultiplexers 221 and 222, where each one video image data is selected (or separated) from each transport stream, then these video image signal are MPEG-decoded in the first and the second video decoders 231 and 232 (each containing the MPEG decoder), so that it is possible to display these two MPEG-decoded video image signals on the double-window screen of the display device 241 such as the cathode-ray tube (CRT) as the main and sub signals, or display these MPEG-decoded two video image signals on individual display screens of the display devices 241 and 242.

Figure 11:
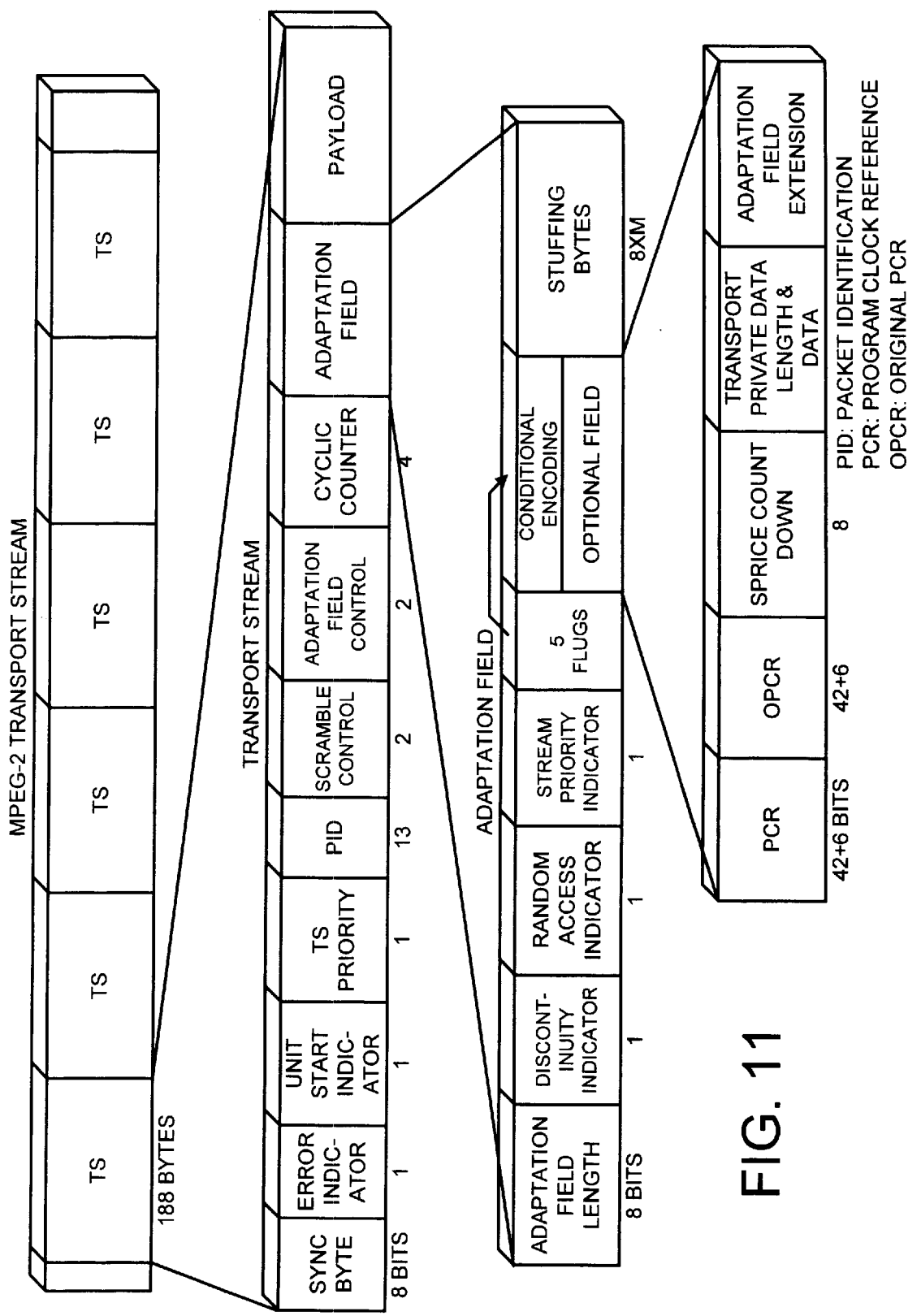
FIG. 11 is a diagram showing the data construction of the MPEG-2 transport packet.

FIG. 11 shows the data construction of the MPEG-2 transport packet. The MPEG-2 System Layer defines that a plurality of video streams are packetized and multiplexed to one transport stream. Here, the packet of the each video streams multiplexed to one transport stream is called the transport packet (TS packet). In the TS packet there is a four-byte header having a PID for identifying the packet. In the decoding of the system layer of the multiplexers 221 and 222, the PID is extracted for identifying the packet. In the case that it is a packet of video image data to be decoded, the packet is extracted and transferred to the video decoders 231 and 232. The PCR is defined on the optional field inside the adaptation field of the transport packet which is a video stream. The number of the video streams which are possible to be multiplexed into one transport stream will be six if the bit rate of the transport stream is 40 Mb/s and the bit rate of the video stream is 6 Mb/s. If it is desired to transmit more further video image streams, a plurality of transport streams are used. To decode a plurality of video streams in the different transport streams, the digital broadcast receiver is needed to receive a plurality of transport streams.

FIG. 7 shows a decode processor which corresponds to the first and the second video decoders 231 and 232, as shown in FIG. 10. In FIG. 7, through the use of the basic circuit, as shown in FIG. 8 (which will be shown later) it is possible to decode the first and second video decoders non-synchronous in one clock generator.

Figure 1:
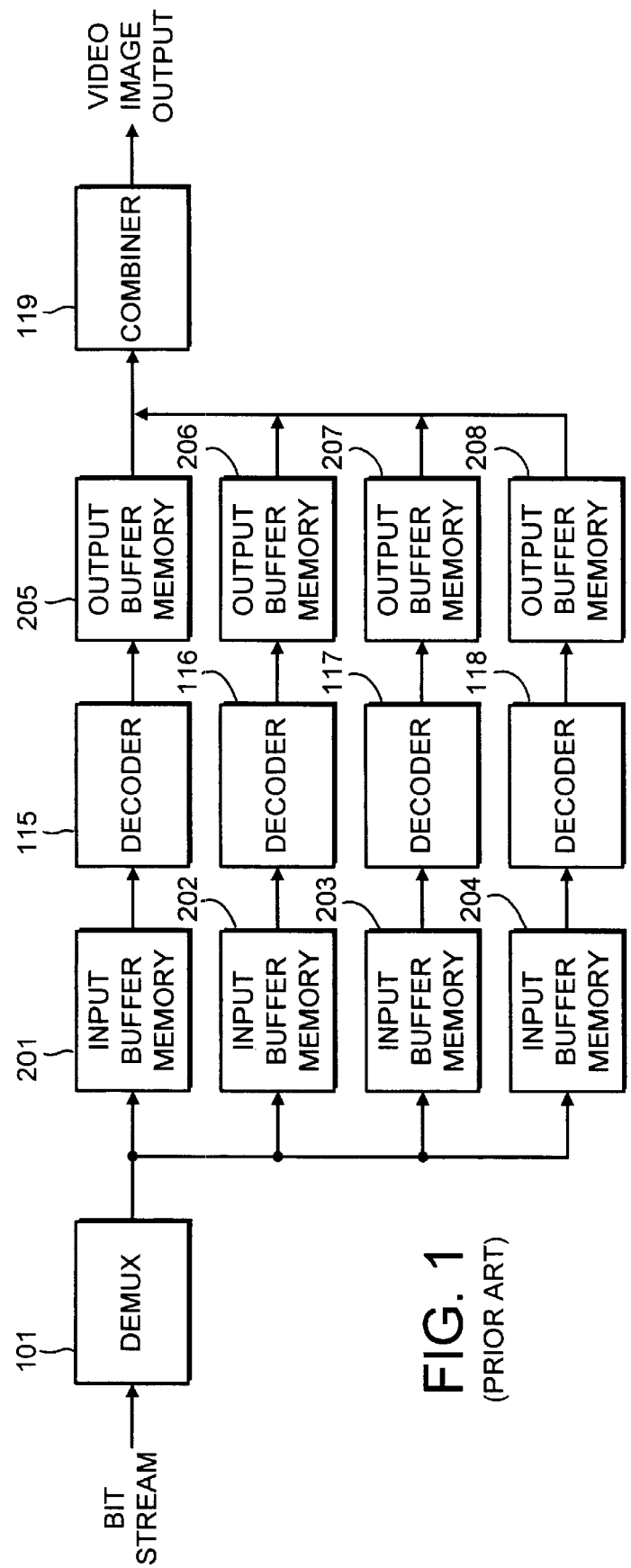
FIG. 1 is a block diagram showing the construction of the conventional decoder.
Figure 2:
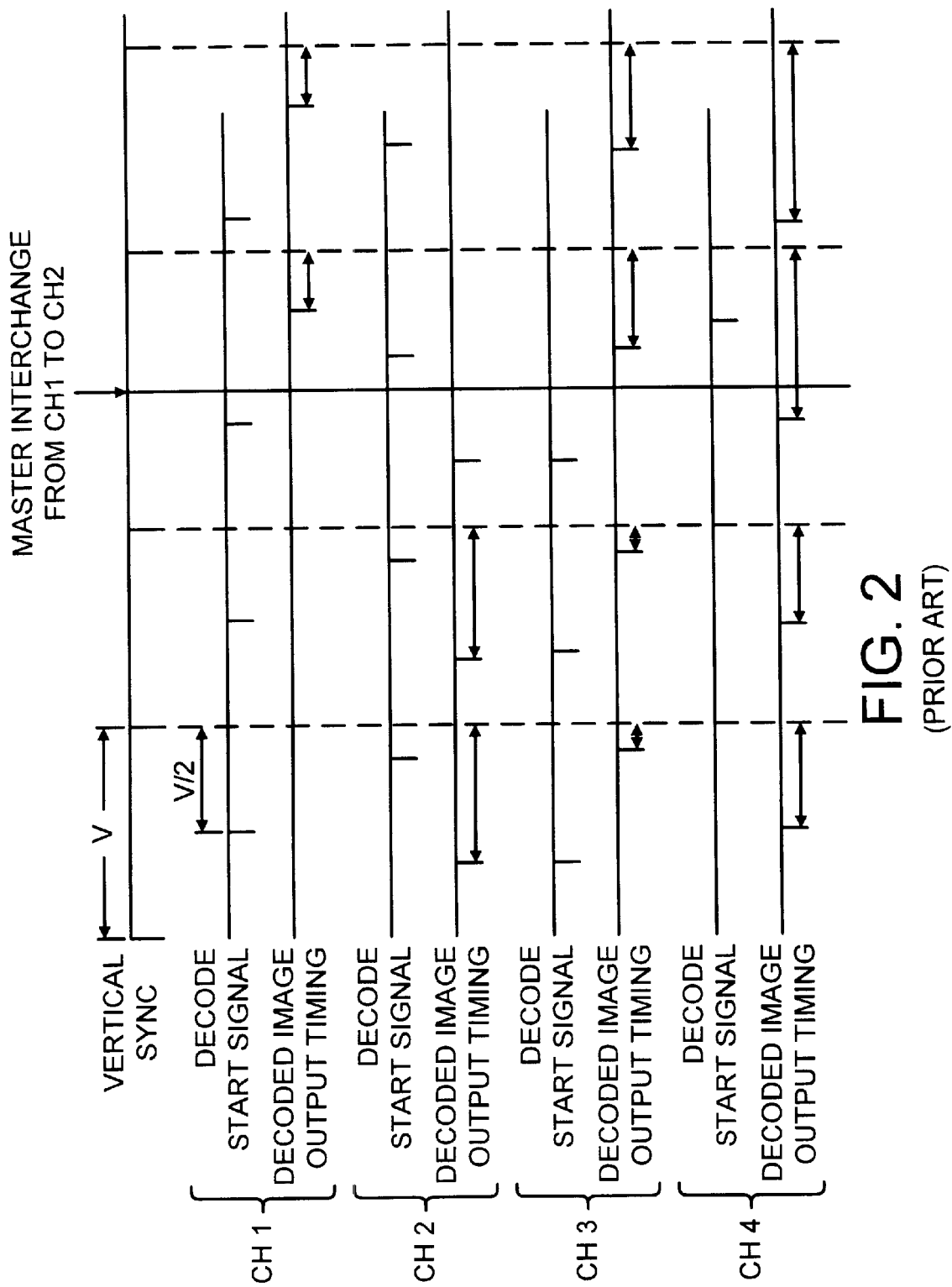
FIG. 2 is a decoding timing chart explaining the conventional operation.
Figure 3:
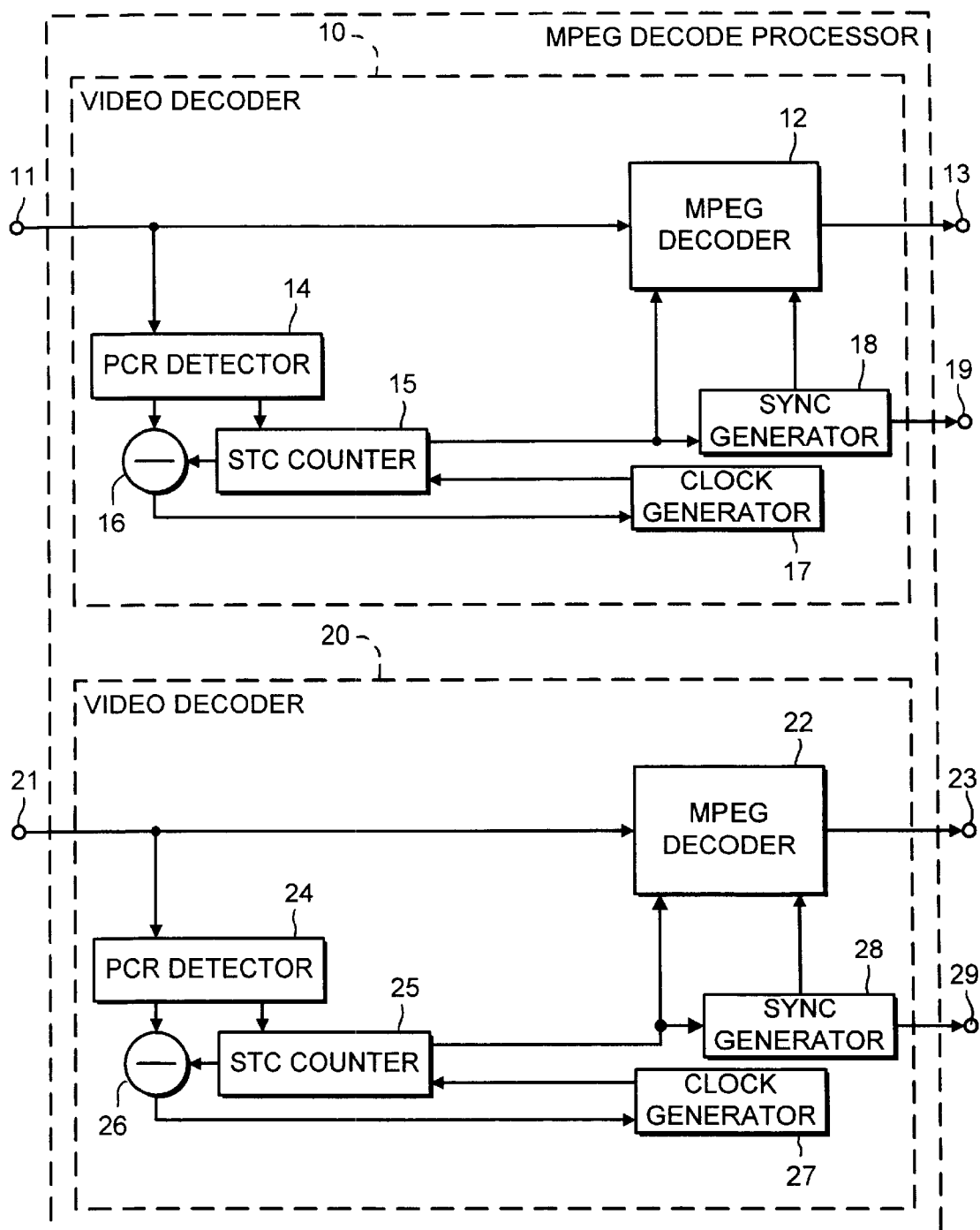
FIG. 3 is a block diagram showing a conventional decode processor.

The decoder 1, as shown in FIG. 7, is comprised of the first and the second video decoders decoding two of the video streams obtained by separating from each of the two transport streams. In FIG. 7, the same components as those, as shown in FIG. 3 are assigned with the same marks. In this embodiment, the clock generator 17, as shown in FIG. 3 is eliminated, and defined only one clock generator 27.

The first video decoder is comprised of an input terminal 11 of the video stream, an MPEG decoder 12 which is the decoder, an output terminal 13 of the video image signal, a PCR detector 14A which is the reference time information detector, at STC counter 15 which is the counter, a synchronizing signal generator 18 which is the synchronizing signal generator, and an output terminal 19 of the synchronizing signal. The second video decoder 22 is comprised of an input terminal 21 of the video image signal, an MPEG decoder 22 which is the decoder, an output terminal 23 of the video image signal, a PCR detector 24 which is the reference time information detector, a STC counter 25 which is the counter, a comparator 26, a clock generator 27 which is the clock generator, a synchronizing signal generator 28 which is the synchronizing signal generator, and an output terminal 29 of the synchronizing signal 29.

The two video streams are supplied to the terminals 11 and 21. The PCR which is the reference time information contained in the video stream, which is supplied to the terminal 11 is detected in the PCR detector 14A. Further, the PCR which is the reference time information contained in the video stream, which is supplied through the terminal 21 is detected in the PCR detector 24. The count of the STC counter 25 is compared with the PCR in the comparator 26, and the oscillating frequency of the clock generator 27 is controlled to make the difference smaller. The clock generated in the clock generator 27 have its frequency which matches to that of the clock at the transmitter side of the video stream which is supplied to the terminal 21, however, generally it does not match to that of the clock at the transmitter side of the video stream which is supplied through terminal 11. The input terminal 11, the PCR detector 14, the STC counter 15, the MPEG decoder 12, the synchronizing signal generator 18, the output terminal 13 and the synchronizing signal output terminal 19 are constructing the basic circuit, as shown in FIG. 8. The MPEG decoder 12 decodes the data based on the count of the STC counter 15 (the value showing the reference time of the video stream supplied through terminal 11. Accordingly, two video image signals are output through terminals 13 and 23, while the synchronizing signals synchronized to the video image signals output through the terminals 13 and 23 are output through the terminals 19 and 29.

FIG. 8 is a block diagram of the basic operation in the decode processor, as shown in FIG. 7, while FIG. 9 is a diagram for explaining the operations of the decode processor.

The basis configuration, as shown in FIG. 8, is comprised of a first video decoder comprised of elements 11, 12, 13, 14A, 15, 18, 19, as shown in FIG. 7 and the clock generator 27 of the second video decoder.

In FIG. 8, the PCR is for transmit the value that the 27 MHz transmitter side clock is counted in the transmitter side counter at the specific cycle (since, for example the PCR is supplied in the cycle 100 ms, assuming the one vertical period being 16.7 ms it is supplied in about every 6 vertical periods). It is provided with the 27 MHz clock generator 27 in the receiver, and it generates the 27 MHz clock in referring to the incoming PCR. The STC counter 15 counts the 27 MHz clock output which is output from the clock generator 27. When the PCR is supplied in conjunction with the video stream through the terminal 11, the PCR detector 14A compares with the count of the STC counter 15 and stores the difference. Then, PCR detector 14A adds (or subtract) the difference and the output from the STC counter 15 at the timing of generating the vertical synchronizing signal V from the synchronizing signal generator 18, and calculates the value (hereinafter, referred to as the corrected value) that the STC counter 15 has to take, so that it loads the corrected value to the STC counter 15. The signal line which returns to the PCR detector 14A from the synchronizing signal generator 18, as shown in FIG. 8 is for applying the vertical synchronizing signal VD from the synchronizing signal generator 18 to the PCR detector 14A. After the timing of the vertical synchronizing signal V is supplied, the PCR detector 14A loads the corrected value based on the difference which is calculated when the PCR is arrived to the STC counter 15. Accordingly, after the loading to the corrected value to the STC counter 15 the arriving PCR and the count of the STC counter are always matched if the frequency of the clock generated in the clock generator 27 matches perfectly to the frequency of the transmitter side clock. However in actual, since they are not always matched there will be the difference between the value of the next arriving PCR and the count of the STC counter 15.

FIG. 9 shows the temporal progress of the STC counter 15, wherein the horizontal axis represents the time t and the vertical axis represents the count of the STC counter 15. It is assumed that the count of the STC counter 15 is 0 at the time 0. The count of the STC counter 15 goes up as time goes. The synchronizing signal generator 18 generates the horizontal synchronizing signal H and the vertical synchronizing signal V according to the count of the STC counter 15 and outputs them supplied through terminal 19. In FIG. 9, the timings of outputting the horizontal synchronizing signal H and of generating the vertical synchronizing signal V are shown as H and V conceptually. Actually, the synchronizing signal generator 18 generates the vertical synchronizing signal V at the 525 H (about 16.7 ms) in case of the NTSC system, however, it is shown in FIG. 9 for simplifying that the vertical synchronizing signal v is generated at 4 H. In actual, every time the count of the STC counter 15 for counting 27 MHz goes up 858×2=1716, it makes the horizontal synchronizing signal H of 15.734 KHz. Further, every time the value goes up 858×525=450450, it makes the vertical synchronizing signal H of 59.94 KHz. In FIG. 9, there is a discontinuity in the increase of the count of the STC counter 15 just after the second occurrence of the time V by the synchronizing signal generator 18. This is where that the difference which is calculated based on the PCR is stored, then the PCR detector 14A loads the corrected value b by added the count of the STC counter 15 at the time Vp after the time V to the STC counter 15. In this case, the count of the STC is higher than the value of the arriving PCR. This means that the clock frequency of the synchronizing signal generator 27 of the receiver is a litter higher than the transmitter side clock. Since the load timing Vp of the corrected value b to the STC counter 15 becomes the time after the timing of the vertical synchronizing signal V from the synchronizing signal generator 18, the timing of generating the next horizontal synchronizing signal H will be later. That is, the time interval of the timing of the vertical synchronizing signal V and the timing of the next horizontal synchronizing signal H which put the timing Vp to be loaded between will be longer than the normal horizontal period (1H). However, the following horizontal synchronizing signals H are output in a fixed period (1 horizontal period; 1H). Accordingly, though the clock signal frequency of the clock generator 27 does not lock to the transmitter side stream to be supplied through terminal 11, the average frequency of the horizontal synchronizing signal H to be reproduced in the receiver and the vertical synchronizing signal V match preferably to the horizontal and the vertical average frequency at the transmitter side. As the result, the moving picture is possible to be reproduced without locking of the flames. Here, since the period between the timing of the vertical synchronizing signal V and the timing of the next horizontal synchronizing signal H before and after the load timing Vp corresponds to the period of the top or the bottom of the screen, even if the horizontal trace interval is longer to a degree it does not affect the actual video image displayed for users.

Figure 12:
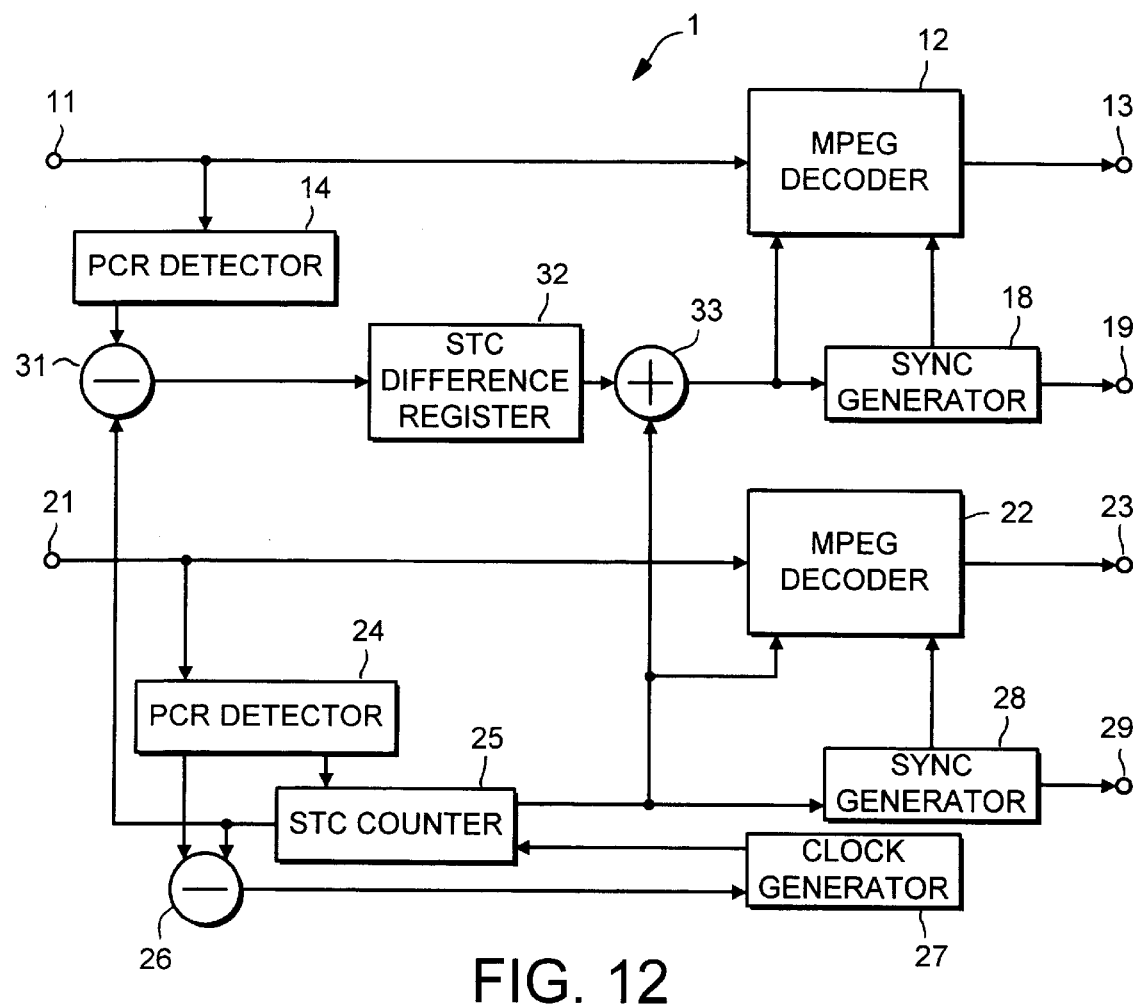
FIG. 12 is a block diagram showing the decode processor of the second embodiment according to the second aspect of the present invention.

FIG. 12 is a block diagram showing the decode processor of the second embodiment according to the second aspect of the present invention. Though in the embodiment of FIG. 7 the STC counters are defined on each first and the second video decoders corresponding to the input two video streams, in this second embodiment it is constructed to have one STC counter.

In FIG. 12, the first video decoder is comprised of the input terminal 11 of the video stream, the MPEG decoder 12 which is the decoder, the output terminal 13 of the video image signal, the PCR detector 14 which is the reference time information detector, the synchronizing signal generator 18 which is the synchronizing signal generator, the output terminal 19 of the synchronizing signal, the comparator 31, the STC difference register 32, and the adder 33. The second video decoder is comprised of the input terminal 21 of the video stream, the MPEG decoder 22 which is the decoder, the output terminal 23 of the video image signal, the PCR detector 24 which is the reference time information detector, the STC counter 25 which is the counter, the comparator 26, the clock generator 27 which is the clock generator, the synchronizing signal generator 28 which is the synchronizing signal generator, and the output terminal 29 of the synchronizing signal. Here, the comparator 31, the STC difference register, and the adder 33 in the first video decoder is constructing the reference time generator for supplying the reference time to the MPEG decoder 12.

The PCR detector 24 extracts the PCR which is the reference time information from the video stream supplied through the terminal 21. The STC counter 25 counts the clock generated in the clock generator 27. The output of the STC counter is compared with the PCR supplied through the terminal 21 (the value detected in the PCR detector 24) in the comparator (differentiator) 26, then the frequency of the clock generated in the clock generator 27 is controlled based on the comparison result. The frequency of the clock generated in the clock generator 27 matches to the clock frequency at the transmitter side of the video stream supplied through the terminal 21. The PCR is extracted from the video stream supplied through the terminal 11 in the PCR detector 14, and the difference of the PCR and the count of the STC counter 25 is counted in the comparator 31 and stored in the STC difference register 32. The count of the STC counter 25 and the content of the STC difference register 32 are added in the adder 33, so as to get the value (count) showing the reference time of the video stream which is supplied through terminal 11. Based on this value, the MPEG decoder 12 decodes, and the synchronizing signal generator 18 generates the synchronizing signal which is synchronized to the video image signal output through the terminal 13.

Figure 13:
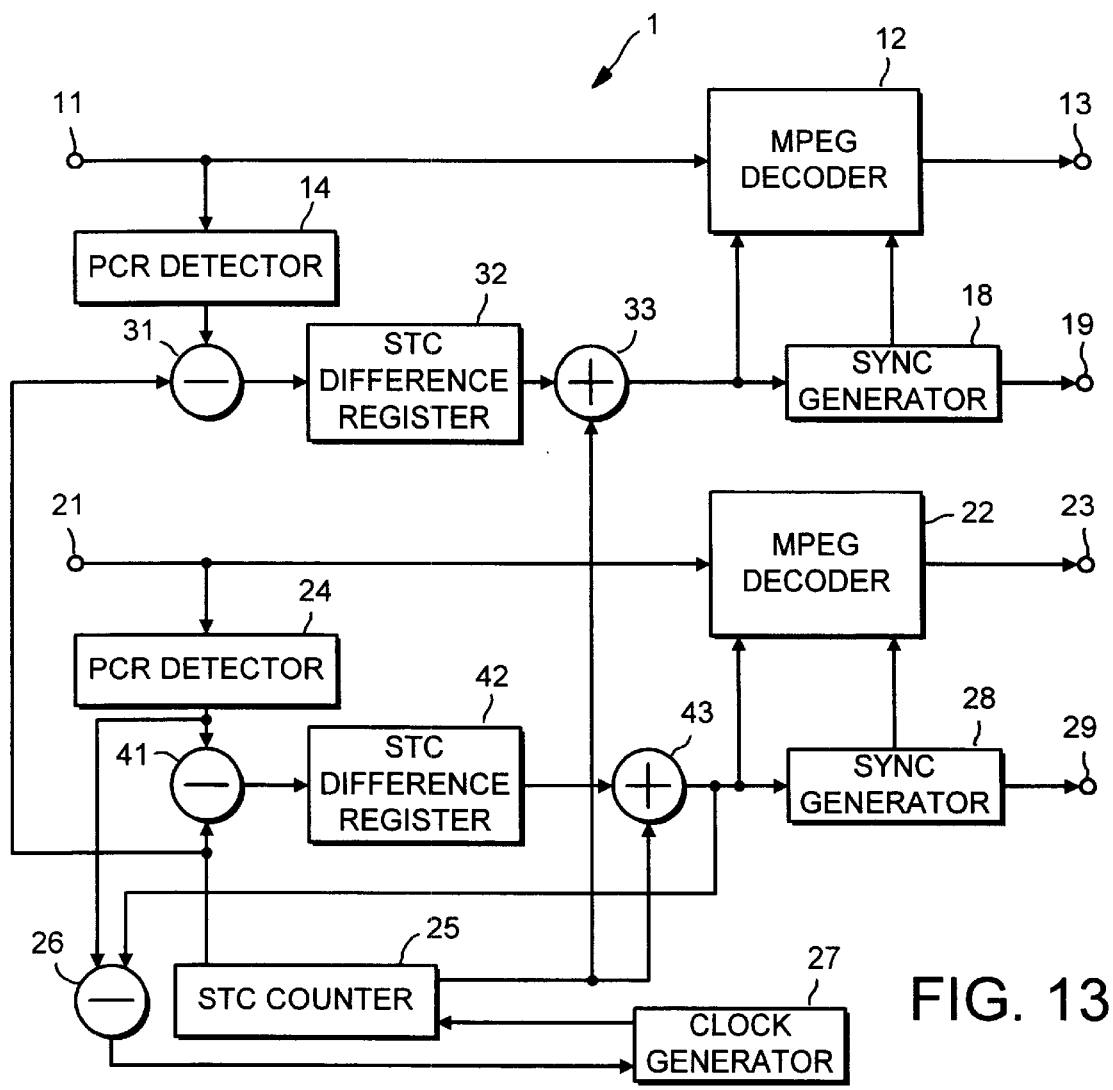
FIG. 13 is a block diagram showing the decode processor of the third embodiment according to the second aspect of the present invention.

In FIG. 12, the STC counter 25 outputs the value (counting value) showing the reference time of the video stream which is supplied through terminal 21. Then, the reference time which is necessary for the decoding of the terminal 11 is obtained by adding the content of the STC difference register 32 to the count of the STC counter 25. However, if the reference time information (PCR) of the video stream which is supplied to the terminal 21 varies the count of the STC counter 25 also varies, so that the sum of the count of the STC counter 25 and the content of the STC difference register 32 represents the reference time necessary for decoding the video stream supplied to the terminal 11. However the sum will change in the instance that the count of the STC counter 25 has changed. That is, when the count of the STC counter 25 changes, the reference time supplied to the MPEG decoder 12 is also changed. Accordingly, the comparator 31 requires the processing to shift the output content of the STC difference register 32 for the changed count of the STC counter 25 which is generated according to the change of the PCR of the terminal 21. FIG. 13 shows the embodiment that the count of the STC counter 25 does not effected by the change of the PCR of the terminal 21.

FIG. 13 is a block diagram showing the decode processor of the third embodiment according to the second aspect of the present invention.

In FIG. 13, the first video decoder is comprised of the input terminal 11 of the video stream, the MPEG decoder which is the decoder, the output terminal 13 of the video image signal, the PCR detector 14 which is the reference time information detector, the synchronizing signal generator 18 which is the synchronizing signal generator, the output terminal 19 of the synchronizing signal, the comparator 31, the STC difference register 32, and the adder 33. The second video decoder is comprised of the input terminal 21 of the video stream, the MPEG decoder 22 which is the decoder, the output terminal 23 of the video image signal, the PCR detector 24 which is the reference time information detector, the STC counter 25 which is the counter, the comparator 26, the clock generator 27 which is the clock generator, the synchronizing signal generator 28 which is the synchronizing signal generator, the output terminal 29 of the synchronizing signal, the comparator 41, the STC difference register 42, and the adder 43. The comparator 31, the STC difference register 32, and the adder 33 in the first video decoder is constructing the first reference 4ime generator. The comparator 31, the STC difference register 42, and the adder 43 in the first video decoder is constructing the second reference time generator.

In this construction the STC counter is also only one. The PCR is extracted from the video stream added to the terminal 21 in the PCR detector 24. The STC counter 25 counts the clock generated in the clock generator 27. The count of the STC counter 25 and the PCR on the terminal 21, i.e., the detection result of the PCR detector 24 are compared in the comparator 41, and the difference is stored in the STC difference register 42. The video stream of the terminal 21 is decoded by supplying the value that the content of the STC difference register 42 is added to the count of the STC counter 25 in the adder 43 to the KPEC decoder 22 as the reference time. The output of the adder 43 and the PCR from the PCR detector 24 are compared in the comparator 26. Based on this comparison result the oscillating frequency of the clock generator 27 is controlled. Accordingly, the oscillation frequency of the clock generator 27 is synchronized to the transmitter side clock of the video stream which is supplied to the terminal 21. Here, since the PCR detected in the PCR detector 24 does not loaded to the STC counter 25, the count of the STC counter 25 is hard to be effected by the PCR change of the terminal 21.

The PCR detector 14 extracts the PCR from the video stream which is added to the terminal 11. The STC counter 25 counts the clock generated in the clock generator 27. The count of the STC counter 25 and the PCR arrived to the terminal 31 are compared in the comparator 31, and the difference is stored in the STC difference register 32. The video stream of the terminal 11 is decoded by supplying the value that the content of the STC difference register 32 is added to the count of the STC counter 25 in the adder 33 to the MPEG decoder 12 as the reference time.

Here, if it is desired that the oscillation frequency of the clock generator 27 is synchronized to the clock on the terminal 21 which is supplied from the transmitter of the video image signal stream, the oscillation frequency of the clock generator 27 may be controlled based on the comparison result of the output value from the adder 33 and the PCR from the PCR detector 14 in the comparator 26.

The STC counter 25 in the embodiment of FIG. 13 does not changed suddenly by the PCR contained in the input video stream. Accordingly, even if the video streams supplied to the terminal 11 and 21 are changed, they do not interfere each other.

Figure 14:
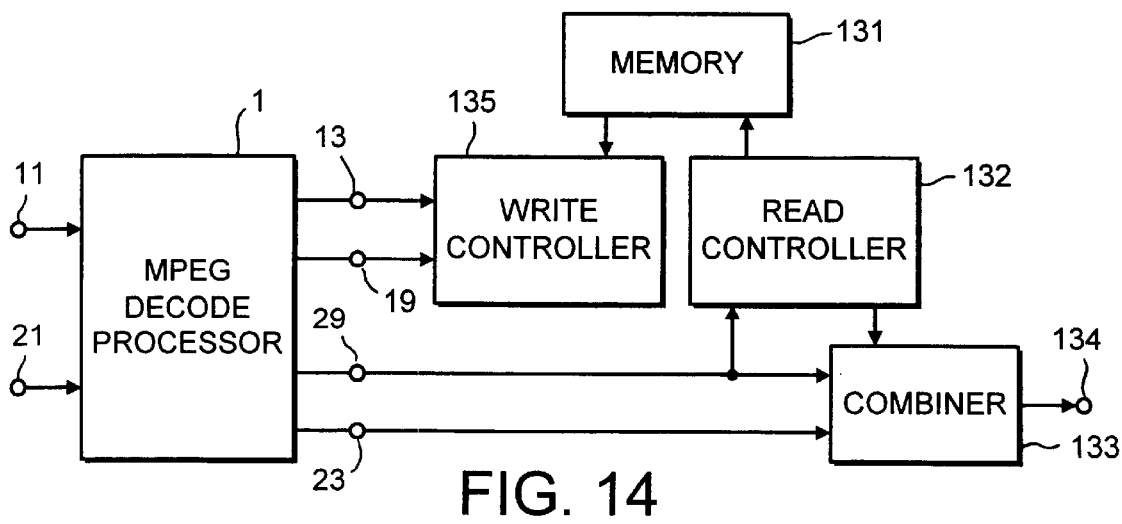
FIG. 14 is a block diagram showing the construction for displaying the two video images on one screen by connecting to the output of the decode processor, as shown in FIGS. 7, 2 and 13.

FIG. 14 shows the construction of displaying two video image signal on one screen by connecting to the output of the decode processor, as shown in embodiment of FIG. 7, FIG. 12 and FIG. 13. To the terminal 11 and 21 the video streams are supplied. The video image signal output from the terminal 13 is written in the memory 131 in the write controller 135, according to the synchronizing signal supplied to the terminal 19. The synchronizing signal output from the terminal 29 is generally non-synchronized to the synchronizing signal output from the terminal 19. The video image signals read out from the memory 131 by the read controller 132 according to the synchronizing signal supplied through the terminal 29 are synchronized to the video image data supplied through the terminal 23. In this case, it is possible to enlarge or reduce the size of images by controlling the read-address. The video image data read out from the memory 131 are supplied to the combiner 133, where they are combined with the video image signal supplied through the terminal 23, and the combined video image signal is output through the terminal 134. This signal is supplied to the display device (not shown, but corresponding to the code 241 in FIG. 10) to be displayed.

Figure 15:
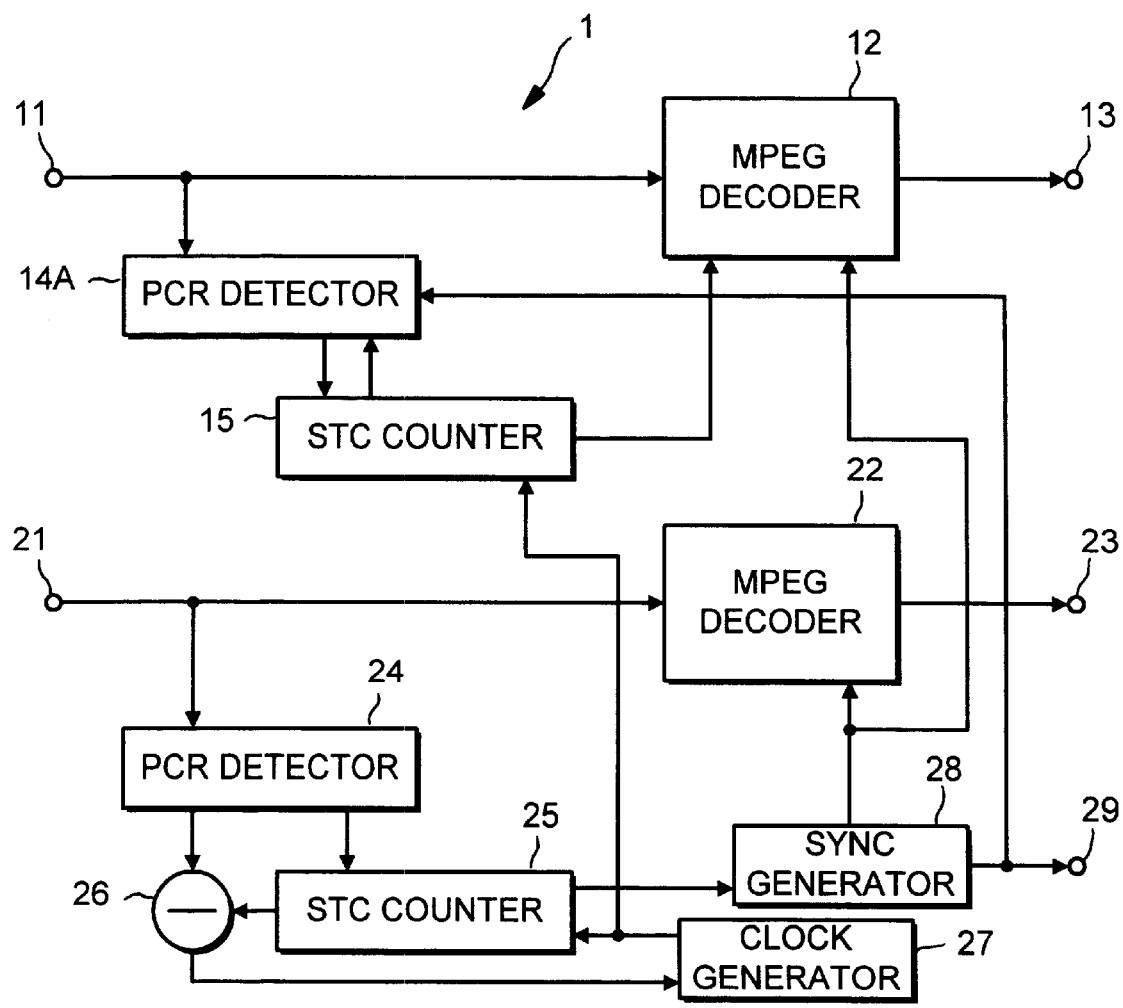
FIG. 15 is a block diagram showing the decode processor of the fourth embodiment according to the second aspect of the present invention.

FIG. 15 is a block diagram showing the decode processor of the fourth embodiment according to the second aspect of the present invention. In this embodiment, the synchronized signal generated in one synchronizing signal generator 28 is used in the MPEG decoders 12 and 22 without the use of the synchronizing signal generator 18, as shown in FIG. 7.

In FIG. 15, the first video decoder is comprised of the input terminal 11 of the video stream, the MPEG decoder 12 which is the decoder, the output terminal 13 of the video image signal, the PCR detector 14A which is the reference time information detector, and the STC counter 15 which is the counter. The second video decoder is comprised of the input terminal 21 of the video stream, the MPEG decoder 22 which is the decoder, the output terminal 23 of the video image signal, the PCR detector 24 which is the reference time information detector, the STC counter 25 which is the counter, the comparator 26, the clock generator 27 which is the clock generator, the synchronizing signal generator 28 which is the synchronizing signal generator, and the output terminal 29 of the synchronizing signal.

The horizontal synchronizing signal H and the vertical synchronizing signal V supplied from the synchronizing signal generator 28 are generally non synchronized to the transmitter side synchronizing signal of the video stream supplied from the terminal 11. Accordingly, the synchronizing signal of the synchronizing signal generator 28 will be non synchronized with each video flames contained in the video streams supplied to the terminal 11.

Figure 16:
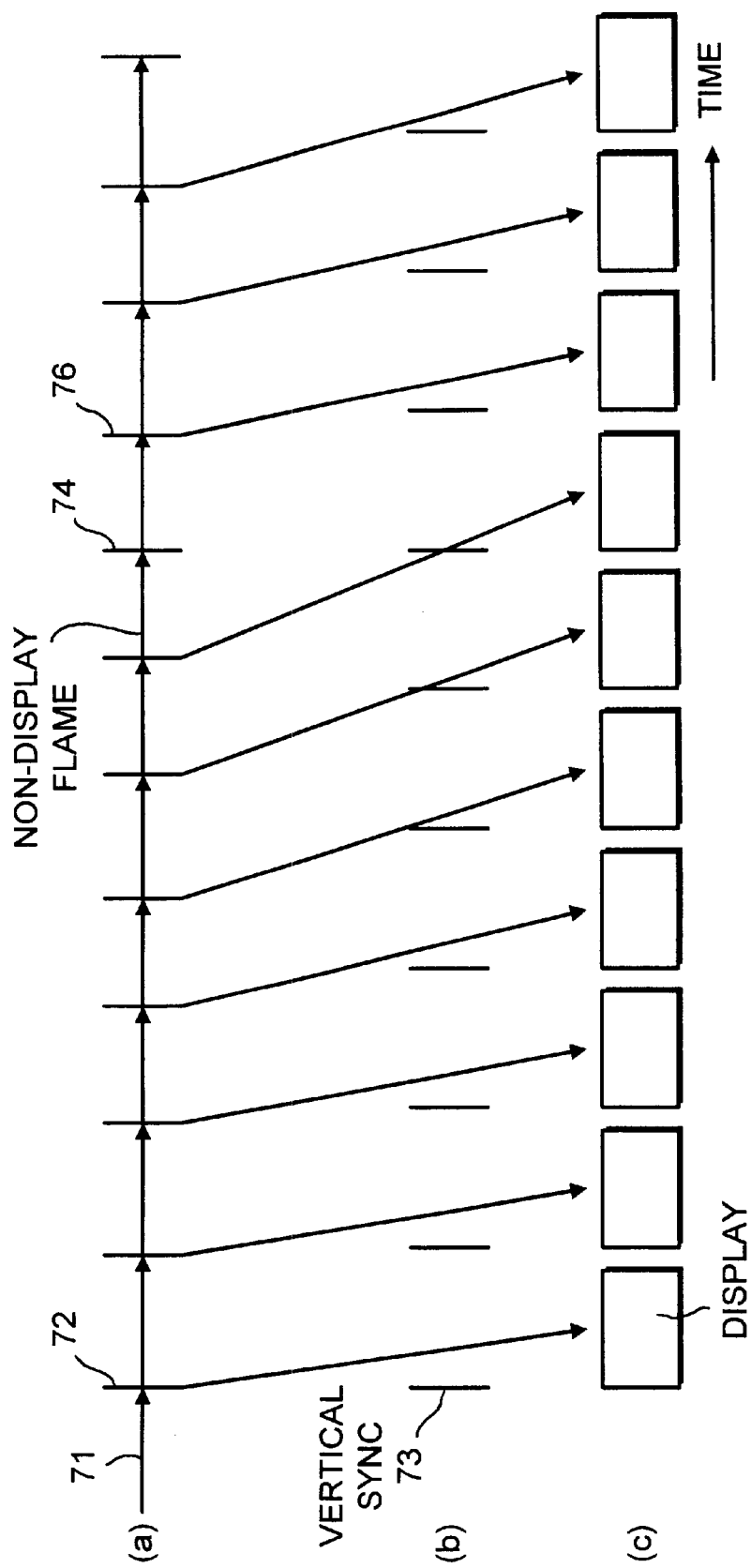
FIG. 16 is a diagram showing the operation of FIG. 15.

FIG. 16 is an operation explaining diagram in case that the video flame from the terminal 11 is decoded non synchronized with the synchronizing signal of the synchronizing signal generator 28. FIG. 16a represents the video flame contained in the video stream which is supplied to the terminal 11. The arrow indicates the decoding state based on the count of the STC counter 15 of each video flames, and the tip of the arrow indicates the completion of decoding of the video flame. FIG. 16b represents the timing of the vertical synchronizing signal supplied to the MPEG decoders 12 and 22 from the synchronizing signal generator 28. FIG. 16c shows the video flame to be displayed. The input video flame and decoded to the MPEG decoder 12 at the timing of the code 71 completes the decoding till the timing of the code 72, then it outputs the signals to the output terminal 13 at the timing of the vertical synchronizing signal of code 73 so as to start the display operation.

Since the video flame of the terminal 11 is not synchronized with the synchronizing signal of the synchronizing signal generator 28, there will be the interval that the vertical synchronizing signal is not exist between the video flame arrived till the timing of code 74 and the video flame arrived till the timing of the code 76. The video flame which is arrived till the timing of the code 74 and decoded is not displayed since there is no vertical synchronizing signal for giving the display timing, and decodes the video flame arrived next till the timing of the code 76, then it is displayed at the timing of the vertical synchronizing signal arrived next. Accordingly, when the frequency of the vertical synchronizing signal used for the display is lower than the frequency of the video flame of the video stream the synchronization is possible to be taken by locking the transmitted video flame. On the other hand, when the frequency is higher, the synchronization is possible to be taken by displaying the same video flame repeatedly for several times.

Figure 17:
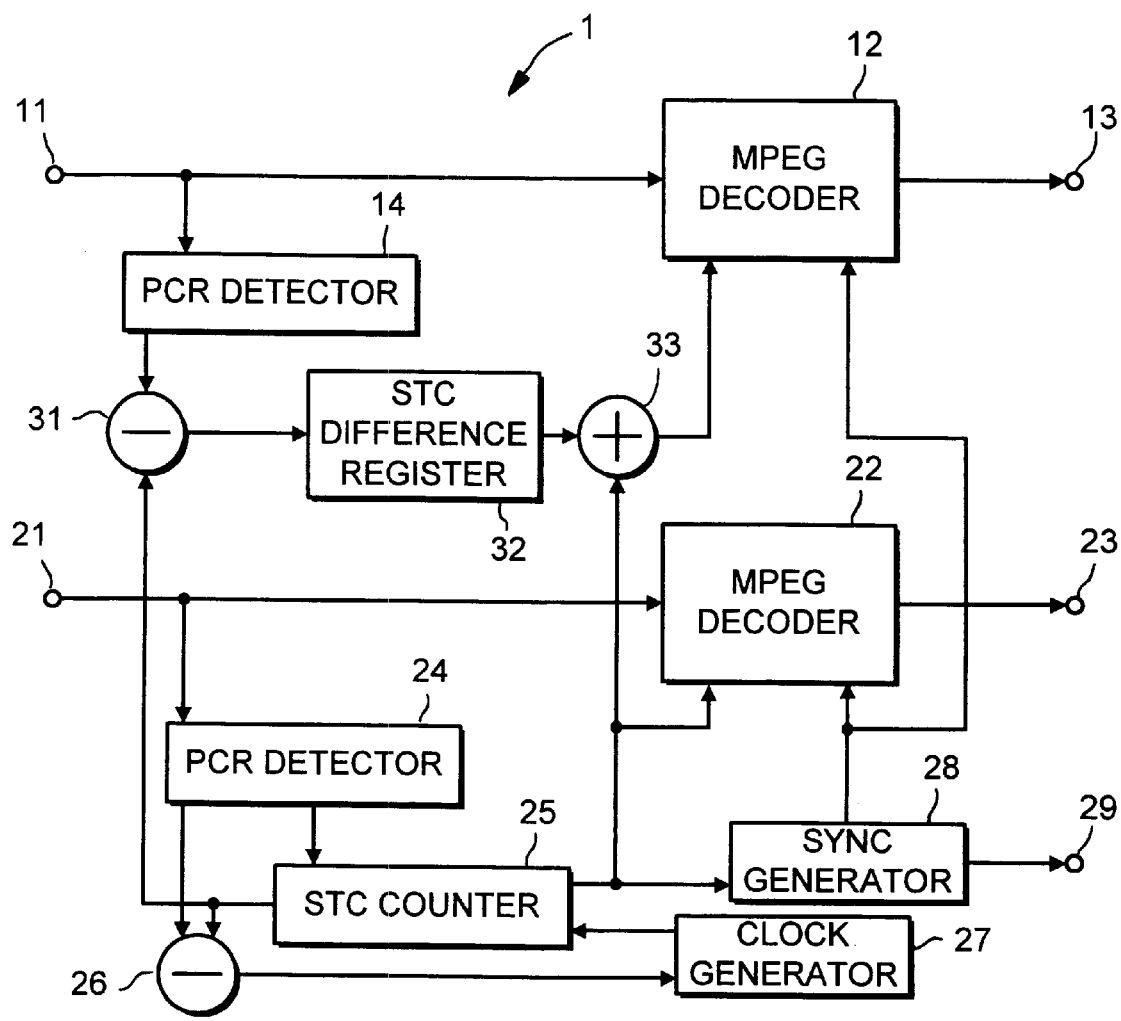
FIG. 17 is a block diagram showing the decode processor of the fifth embodiment according to the second aspect of the present invention.

FIG. 17 shows the decode processor of the fifth embodiment according to the second aspect of the present invention. In FIG. 17, the first video decoder is comprised of the input terminal 11 of the video stream, the MPEG decoder 12 which is the decoder, the output terminal 13 of the video image signal, the PCR detector 14 which is the reference time information detector, the comparator 31, the STC difference register 32, and the adder 33. The second video decoder is comprised of the input terminal 21 of the video stream, the MPEG decoder 22 which is the decoder, the output terminal of the video image signal, the PCR detector 24 of the reference time information detector, the STC counter 25 which is the counter, the comparator 26, the clock generator 27 which is the clock generator, and the output terminal 29 of the synchronizing signal. The comparator 31, the STC difference register 32, and the adder 33 in the first video decoder construct the reference time generator.

In the embodiment of FIG. 17, it defined only one STC counter 25 by replacing the two STC counters 15 and 25, as shown in FIG. 15 with the comparator 31, the STC difference register 32, and the adder 33 in a similar manner, as shown in FIG. 12.

Figure 18:
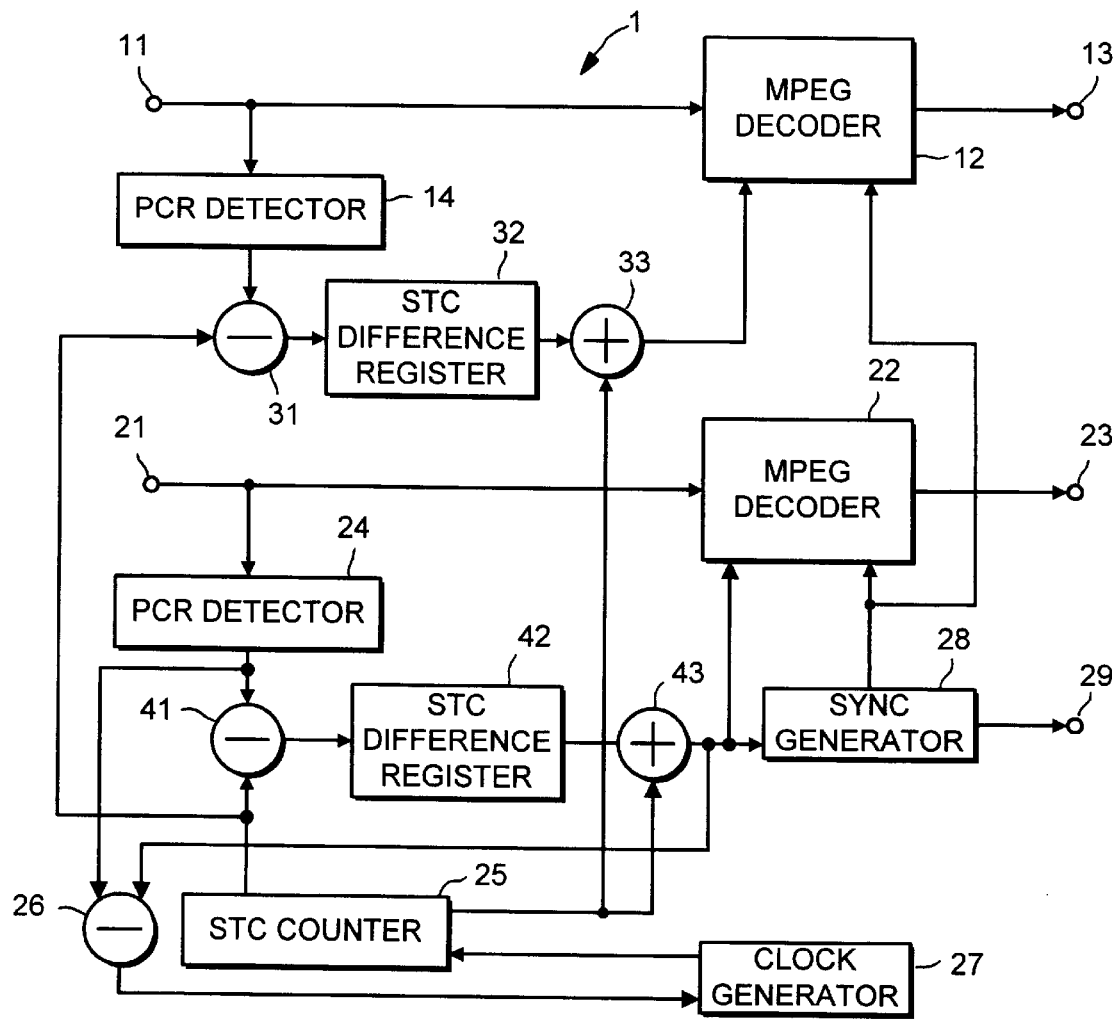
FIG. 18 is a block diagram showing the decode processor of the sixth embodiment according to the second aspect of the present invention.

FIG. 18 is a block diagram showing the decode processor of sixth embodiment according to the second aspect of the present invention. In FIG. 18, the first video decoder is comprised of the input terminal 11 of the video stream, the MPEG decoder 12, the output terminal 13 of the video image signal, the PCR detector 14, the comparator 31, the STC difference register 32, and the adder 33. The second video decoder is comprised of the input terminal 21 of the video stream, the MPEG decoder 22, the output terminal 23 of the video image signal, the PCR detector 24, the STC counter 25, the comparator 26, the clock generator 27, the synchronizing signal generator 28, the output terminal 29 of the synchronizing signal, the comparator 41, the STC difference register 42, and the adder 43.

The embodiment of FIG. 18 shows the construction for solving the problem of count change from the STC counter 25 based on the PCR in the embodiment of FIG. 17 in the case of taking one STC counter. In this construction the drawback of the circuit of FIG. 17 is solved in the similar manner taken in the construction of FIG. 13 for solving the drawback that the count of the STC counter 25 changes in conjunction with the change of the PCR. That is, since the PCR detected in the PCR detector 24 does not loaded on the STC counter 25, the count of the STC counter 25 is hard to be effected by the PCR change of the video stream which is supplied through terminal 21.

Figure 19:
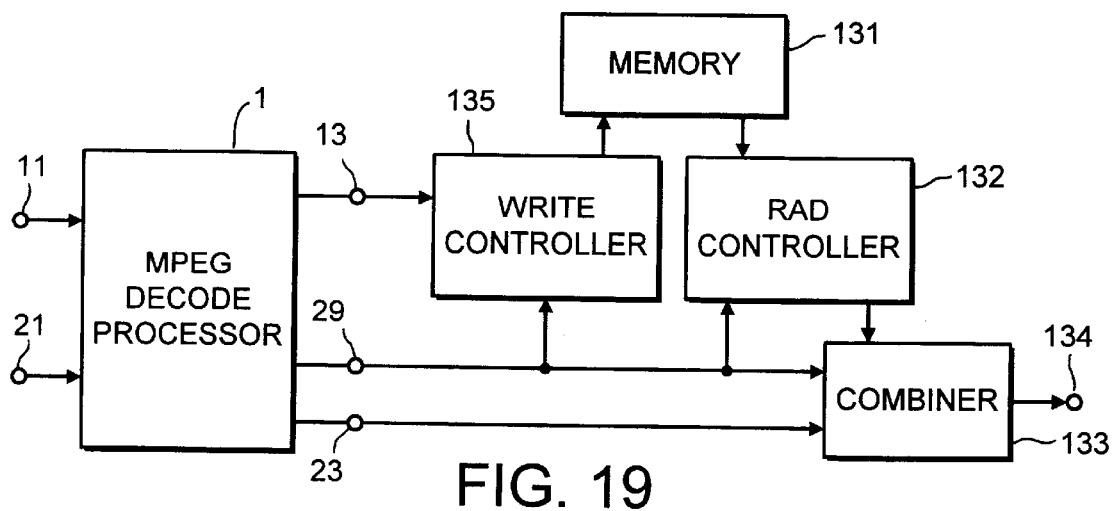
FIG. 19 is a block diagram showing the construction for displaying the two video images on one screen by connecting to the output of the decode processor, as shown in FIGS. 15, 17 and 18.

FIG. 19 shows the construction for displaying two video image on one screen by connecting to the outputs of the decode processors, as shown in FIGS. 15, 17 and 18. Tow video streams are supplied to the terminals 11 and 12, and decoded in the MPBG decoder 1. The video image signal decoded the video stream which is supplied to the terminal 11 is supplied through the terminal 13, and the write controller 131 writes the memory in based on the synchronizing signal supplied through the terminal 29. The synchronizing signal obtained the terminal 29 is one synchronizing to the video image signal of the video stream which is supplied to the terminal 21. The read controller 132 reads out the video image data from the memory 131 according to the synchronizing signal which is supplied through the terminal 29. In this case, the data is possible to be enlarged or reduced by the control of the read-address. The combiner 133 combines the video image data read out from the memory 131 in the read controller 132 and the data supplied through the terminal 23, so as to output the combined video image signal to the terminal 134. This signal is displayed by being supplied to the display device (not shown, but corresponding to the code 241 in FIG. 10).

Here, in the embodiments mentioned above, a decode processor comprised of the first and the second video decoders is explained, however, it is possible to be supplied to a decode processor comprised of n video image decoders (n≧2, n is a positive number).

That is, in a decode processor provided with the n (n≧2, n is a positive number) decoders for decoding the n streams of MPEG-encoded video image data transmitted in conjunction with the reference time information, at least one of the n decoders may be the basic processor (decode processor), as shown in FIG. 8.

Relating to FIG. 14 and FIG. 19, at least one video image signal of the-n video image signals supplied from the n decoders are stored in the memory based on the synchronizing signal of its video image signal, and at least one video image signal of the n video image signals is read out based on the synchronizing signal of its video image signal, so that at least two video image signals of n video image signals are possible to be synchronized.

Further, in reference to FIG. 7, in a decode processor for decoding the n (n≧2, n is a positive number) streams of MPEG-encoded video image data transmitted in conjunction with the reference time information, it may be constructed by provided with the n reference time information detectors for detecting the reference time information contained in the n streams, at most n-1 clock generators for generating the clock of frequency which is not locked to the transmitter side clock of at least one stream of n streams, at most n-1 counters for counting the clock from the clock generator, which count is corrected by the indication from the reference time information detector, at least one counter for counting the clock from the clock generator, which is possible to correct the clock frequency of the clock generator based on the comparison result of comparing its count and the at least one output value of the reference time information detector, the n synchronizing signal generators for generating the synchronizing signal based on the count of the n counters, and the n decoders for decoding the n streams according to the count of the n counters.

Relating to the embodiment of FIG. 12, in a decode processor for decoding the n (n≧2, n is a positive number) streams of MPEG-encoded video image data transmitted in conjunction with the reference time information, it may be constructed by provided with the n reference time information detectors for detecting the references time information contain in the n streams, at most n-1 clock generators for generating the clock having the frequency which is not locked to the transmitter side clock of at least one stream of n streams, at least one counter for counting the clock from the clock generator, which is possible to correct the clock frequency of the clock generator based on the comparison result of comparing its count and at least one output value of the reference time information detector, at most n-1 reference time generators for generating the reference time based on the output value from the reference time information detector and the count of the counter, n synchronizing signal generators for generating the synchronizing signal based on the count of at least one counter or the output value of at most n-1 reference time generators, and the n decoders for decoding the n streams according to the output value of the reference time generator and the count of the counter.

Relating to the embodiment of FIG. 13, it is a decode processor for decoding the n (n≧2, n is a positive number) streams of MPEG-encoded video image data transmitted in conjunction with the reference time information, it may be constructed by provided with the reference time information detector for detecting the reference time information contained in the n streams, the clock generator for generating the clock having the frequency which is not locked to the transmitter side clock of n-1 streams of n streams, the counter for counting the clock from the clock generator, the n reference time generators for generating the reference time based on the output value of n reference time information detectors and the count of the counter, n synchronizing signal generators for generating the synchronizing signal based on the output value of the n reference time generators, and the n decoders for decoding the n streams according to the output value of the n reference time generators.

Further, referring to FIG. 15, in a decode processor for decoding the n (n≧2, n is a positive number) streams of MPEG-encoded video image data transmitted in conjunction with the reference time information, it may be constructed by provided with the n reference time information detectors for detecting the reference time information contained in the n streams, at most n-1 clock generators for generating the clock having the frequency which is not locked to the transmitter side clock of at least one stream of n streams, at most n-1 counters for counting the clock from the clock generator, which count is corrected by the indication from the reference time information detector, at least one counter for counting the clock from the clock generator, which is able to correct the clock frequency of the clock generator based on the comparison result of comparing its count and at least one output value of the reference time information detector, at least one synchronizing signal generator for generating the synchronizing signal based on the count of at least one counter, n decoders for decoding n streams according to the count of n counters, which output the video image signals which are synchronized with the timing of the synchronizing signal by thinning out the video flame or outputting the same video image signal repeatedly for several times in the case that the timings of outputting from the counter and the synchronizing signal from the synchronizing signal generator which gives the display timing are not matches.

Referring to FIG. 11, a decode processor for decoding the n (n≧2, n is a positive number) streams of MPEG-encoded video image data transmitted in conjunction with the reference time information, it may be constructed by provided with n reference time information detectors for detecting the reference time information contained in the n streams, at leas n-1 clock generators for generating the clock having the frequency which is not locked to the transmitter side clock of at least one stream of n streams, at least one counter for counting the clock generated from the clock generator which is able to correct the clock frequency of the clock generator based on the comparison result of comparing its count and the at least output value of the reference time information detector, at most n-1 reference time generators for generating the reference time based on the output value of the reference time information detector and the count of the counter, at least one synchronizing signal generator for generating the synchronizing signal based on the count of at least one of the n counters, and at least one of n decoders outputs the video image signal synchronized with the timing of the synchronized signal by thinning out the video flame or outputting the same video flame repeatedly for several times in the case that the timings of output from the reference time generator and the synchronizing signal from the synchronizing signal generator which give the display timing are not matched.

And at least one of n decoders outputs the video image signal synchronized with the timing of the synchronized signal by thinning out the video flame or outputting the same video flame repeatedly for several times in the case that the timings of output from the reference time generator and the synchronizing signal from the synchronizing signal generator which give the display timing are not matched.

Referring to FIG. 18, a decode processor for decoding the n (n≧2, n is a positive number) streams of MPEG-encoded video image data transmitted in conjunction with the reference time information, it may be constructed by provided with n reference time information detectors for detecting the reference information contained in n streams, the clock generator for generating the clock having the frequency which is not locked to the transmitter side clock of n-1 streams of the n streams, the counter for counting the clock from the clock generator, n reference time generators for generating the reference time based on the output value from n reference time information detectors and the count of the counter, synchronizing signal generator for generating the synchronizing signal based on one output value of one the n reference time generators, and the n decoders for decoding the n streams according to the output value of the n reference time generators, and n-1 decoders which output the video image signal synchronized with the timing of the synchronizing signal by thinning out the video flame or outputting the same video flame repeatedly for several times in the case that the timings of the output from the reference time generator and the synchronizing signal from the synchronizing signal generator which gives the display timing are not matched.

As describe above, the present invention can provide an extremely preferable video image signal decoding method and apparatus for decoding a plurality of decoded video image signals simultaneously.

That is, according to the first aspect of the present invention, by generating the decode starting signal which is common to each decoding video image signal according to the system clock regenerated from the master stream the phase of the synchronizing signal is not disturbances even if the channel selected as the master stream is changed, when displaying a plurality of video images, which are decoded simultaneously, on the multi-windows, so that the displayed video image is not disturbed.

Further, according to the first aspect of the present invention, since the output buffer memory for matching the time of the output video image signal, it is possible to eliminate the output buffer memories and thus possible to reduce the total capacity of the input and output buffer memories. So that, it is possible to reduce the amount of hardware in the decoder and it is possible to be miniaturized, high reliance and a low power consumption.

Further, according to second aspect of the present invention, it is possible to performs a plurality of decode processors in one clock without the use of two or more clocks, and also possible to use only one synchronizing signal which is necessary for the decoding output, so as to simplify the system design and improve the flexibility of the system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A decoding method for decoding a video image signal, comprising:
   separating at least one of streams of video image signal to be decoded from a multiplexed stream received therein, which contains a plurality of video image signals;
   selecting one stream including a video image signal to be assigned to a master video image signal, which will be assigned to a master stream from the multiplexed stream;
   regenerating a reference time and a system clock which are used in decoding of the video image signal to be assigned to the master video image signal, based on a reference time information contained in the master stream;

regenerating a reference time used for decoding the separated video image signal through the use of the reference time information contained in the separated stream of the video image signal to be decoded and the regenerated system clock;

generating a decode starting signal though the use of the regenerated system clock;

storing the video image signal contained in the separated stream in an input buffer memory in parallel with the processing of the separating, the selecting, the regenerating the reference time and the system clock, the regenerating the reference time used for decoding and the generating; and starting a decoding of the video image signal stored in the input buffer memory by the decode starting signal.

2. A video image signal decoding method as claimed in claim 1, wherein the decode starting signal is a signal synchronizing a synchronizing signal of displaying which is not depend upon the decode starting time information contained in a video image signal to be assigned to a master video image signal.

3. A video image signal decoding method as claimed in claim 1 or 2, wherein the input buffer memory has a capacity larger than the data amount required for starting decoding based on the decode starting time information contained in the data by more than the maximum data amount supplied for one frame period of the video image signal assigned to a master video image signal.

4. A decoder for decoding a video image signal comprising:

a separator configured to separate at least one of streams of video image signal to be decoded from a multiplexed stream received therein, which contains a plurality of video image signal;

a selector configured to select one stream including a video image signal to be assigned to a master video image signal, which will be assigned to a master stream from the multiplexed stream;

at least one buffer memory configured to store the video image signal contained in each separated stream;

a clock regenerator configured to regenerate a reference time and a system clock which are used in decoding of the video image signal to be assigned to the master video image signal, based on a reference time information contained in the master stream;

a reference time regenerator configured to regenerate a reference time used for decoding the separated video image signal through the use of the reference time information contained in the stream of the video image signal to be decoded and the regenerated system clock;

a decode starting signal generator configured to generate a decode starting signal which is common to each of the separated stream through the use of the regenerated system clock; and at least one decoder configured to start a decoding of the video image signal stored in the input buffer memory by the decode starting signal.

5. A video image signal decoder as claimed in claim 4, wherein the decode starting signal generated in the decode starting signal generator is synchronized with the synchronizing signal in a display system which is independent to the decode starting time information contained in the video image signal to be assigned to a master video image signal.

6. A video image signal decoder as claimed in claim 4 or 5, wherein the input buffer memory has a capacity larger than the data amount required for starting decoding based on the decode starting time information contained in the data by more than the maximum data amount supplied for one frame period of the video image signal assigned to a master video image signal.

7. A decode processor configured to decode a stream of MPEG-encoded video image data transmitted in conjunction with reference time information, comprising:

a reference time information detector for detecting the reference time information contained in the stream;

a clock generator for generating a clock having a frequency which is not locked to a clock in a transmitter for transmitting the stream;

a counter for counting the clock from the clock generator which count is amended by the direction from the reference time information detector;

a synchronizing signal generator for generating a synchronizing signal based on the count of the counter; and a decoder for decoding the stream according to the count of the counter.

8. A decode processor as claimed in claim 7, wherein the timing that the count of the counter is amended by the direction from the reference time information detector will follow the synchronizing signal generated in the synchronizing signal generator.

9. A decode processor configured to receive n streams of MPEG-decoded video image data (n denotes an integer of 2 or more; i.e., n $\geq$ 2) transmitted in conjunction with the reference time information, wherein the decoder comprises at least one of decoder as claimed in claim 7 or 8.

10. A decode processor as claimed in claim 9, further comprising a synchronizer for synchronizing at least two video image signals in n video image signals by memorizing at least one video image signal in the n video image signals supplied from the n decoders based on the synchronizing signal of that one video image signal, and by reading the video image signal based on the synchronizing signal of at least one video image signal in the n video image signals.

11. A decode processor configured to decode n (n denotes an integer of 2 or more; i.e., n$\geq$2) streams of MPEG-encoded video image signals transmitted along with a corresponding reference time information, comprising:

n reference time information detectors configured to detect the reference time information contained in the n streams;

a most n-1 clock generators configured to generate a clock having a frequency which is not locked to a transmitter side clock of at least one stream in n streams;

at most n-1 counters configured to count the clock from the clock generator, which count is amended by the direction from the reference time information detector;

at least one counter configured to count the clocks from the clock generator, which is correctable the clock frequency of the clock generator based on the comparison result of the count of the clock generator with the output value of at least one of the reference time information detectors;

n synchronizing signal generators configured to generate a synchronizing signal based on the count of n counters; and n decoders configured to decode n streams according to the count of n counters.

12. A decode processor configured to decode n (n denotes an integer of 2 or more; i.e., n$\geq$2) streams of MPEG-encoded video image signals transmitted along with a corresponding reference time information, comprising:

n reference time information detectors configured to detect the reference time information contained in the n streams;

at most n-1 clock generators configured to generate a clock with a frequency which is not locked to a transmitter side clock of at least one stream in n streams;

at least one counter configured to count the clock from the clock generator, which is correctable the clock frequency of the clock generator based on the comparison result of the count of the clock generator with at least one output value from the reference time information detector;

at most n-1 reference time generators configured to generate reference time based on the output value of the reference time information detector and the count of the counter;

n synchronizing signal generators configured to generate a signal based on the count of at least one counter or the output value of at most n-1 reference time generators; and n decoders configured to decode n streams according to the output value of the preference time generator or the count of the counter.

13. A decode processor configured to decode n (n denotes an integer of 2 or more; i.e., n≥2) streams of MPEG-encoded video image signals transmitted along with a corresponding reference time information, comprising:

n reference tie information detectors for detecting the reference time information contained in n stream;

clock generator for generating the frequency which is not locked to the a transmitter side clock of at least one stream of n streams;

counter for counting the clock from the clock generator;

n reference time generators for generating the reference time based on the output value of the n reference time information detectors and the count of the counter;

n synchronizing signal generators for generating the synchronizing signal based on the output value of the n reference time generators; and n decoders for decoding the n streams according to the output value of the n reference time generators.

14. A decode processor configured to decode n (n denotes an integer of 2 or more; i.e., n≥2) streams of MPEG-encoded video image signals transmitted along with a corresponding reference time information comprising:

n reference time information detectors for detecting the reference time information contained in n streams;

at most n-1 clock generators for generating a clock having a frequency which is not locked to a transmitter side clock of at least one stream of n streams;

at most n-1 counters for counting the clock from the clock generator, which count is amended by the direction from the reference time information detector;

at least one counter for counting the clock from the clock generator, which is correctable the clock frequency of the clock generator based on the comparison result of the count of the clock generator with at least one output value from the reference time information detector;

at least one synchronizing signal generator for generating the synchronizing signal based on the count of at least one counter;

n decoders, which decoding the n streams according to the n counters, for outputting the video image signal synchronized with the synchronizing signal by thinning out the video flame or outputting the same video flame repeatedly for several times, in the case that the timing of the output from the counter and the synchronizing signal from the synchronizing signal generator which makes the timing is not adjusted.

15. A decode processor configured to decode n (n denotes an integer of 2 or more; i.e., n≥2) streams of MPEG-encoded video image signals transmitted along with a corresponding reference time information, comprising:

n reference time information detectors for detecting the reference time information contained in n streams;

at most n-1 clock generators for generating a clock having a frequency which is not locked to a transmitter side clock of at least one stream of n streams;

at least one counter for counting the clock from the clock generator, which is correctable the clock frequency of the clock generator based on the comparison result of the count of the clock generator with at least one output value from the reference time information detector;

at most n-1 reference time generators for generating the reference time based on the output value of the reference time information detector and the count of the counter;

at least one synchronizing signal generator for generating the synchronizing signal based on the count of at least one in the n counters; and n decoders, which is decoding the n streams according to the output value of the reference time generator or the count of the counter, for thinning out the video image signal flame or outputting the same video image signal flame repeatedly for several times, in the case that the timing of the output from reference time generator with the synchronizing signal from the synchronizing signal generator which makes the timing is not adjusted.

16. A decoded processor, which decodes n (n denotes an integer of 2 or more; i.e., n≥2) streams of MPEG-encoded video image signals transmitted along with a corresponding reference time, comprising:

n reference time information detectors for detecting the reference time information contained in n streams;

clock generator for generating the clock of the frequency which is not locked to the transmitter side of n-1 streams of n streams;

counter for counting the clock from the clock generator;

n reference time generators for generating reference time based on the output value from the n reference time information detectors and the count of the counter;

synchronizing signal generator for generating the synchronizing signal based on one output value of n reference time generators; and n decoders, which decoding the n streams according to the output value of the n reference time generators, for outputting the video image signal flame repeatedly for several times in the case that the timing of the output from the reference time generator and the synchronizing signal from the synchronizing signal generator which makes the timing is not adjusted.

17. A decode processor as claimed in any one of claims 10, 12, 13, 15 and 16, wherein the at least one of the n decoders performs the decoding processing through the use of the value obtained by adding the offset value to the count of the counter as the reference time.

* * * * *